United States Patent
Li et al.

(10) Patent No.: US 12,382,021 B2
(45) Date of Patent: **\*Aug. 5, 2025**

(54) INTRA PREDICTION METHOD ON BASIS OF MPM LIST AND APPARATUS THEREFOR

(71) Applicant: LG ELECTRONICS INC., Seoul (KR)

(72) Inventors: Ling Li, Seoul (KR); Jaehyun Lim, Seoul (KR); Jin Heo, Seoul (KR); Jangwon Choi, Seoul (KR); Seunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/632,155

(22) Filed: Apr. 10, 2024

(65) Prior Publication Data
US 2024/0357077 A1 Oct. 24, 2024

Related U.S. Application Data

(63) Continuation of application No. 17/442,912, filed as application No. PCT/KR2020/003920 on Mar. 23, 2020, now Pat. No. 11,997,256.

(60) Provisional application No. 62/823,720, filed on Mar. 26, 2019.

(51) Int. Cl.
*H04N 19/105* (2014.01)
*H04N 19/132* (2014.01)
*H04N 19/159* (2014.01)
*H04N 19/176* (2014.01)
*H04N 19/46* (2014.01)

(52) U.S. Cl.
CPC ......... *H04N 19/105* (2014.11); *H04N 19/132* (2014.11); *H04N 19/159* (2014.11); *H04N 19/176* (2014.11); *H04N 19/46* (2014.11)

(58) Field of Classification Search
None
See application file for complete search history.

(56) References Cited

U.S. PATENT DOCUMENTS

| | | | |
|---|---|---|---|
| 10,419,754 B1 * | 9/2019 | Zhao | H04N 19/593 |
| 10,979,708 B2 * | 4/2021 | Lim | H04N 19/463 |
| 11,463,689 B2 * | 10/2022 | Zhao | H04N 19/11 |

(Continued)

*Primary Examiner* — Stefan Gadomski
(74) *Attorney, Agent, or Firm* — Bryan Cave Leighton Paisner LLP

(57) ABSTRACT

An image decoding method performed by a decoding apparatus according to the present disclosure comprises the steps of: obtaining intra prediction information including at least one of MPM flag information, MRL index information, and planner flag information from a bitstream; checking the MPM flag information; checking the MRL index information on the basis of a case where the MPM flag information indicates that the MRL index information is checked; checking the planner flag information on the basis of a case where a value of the MRL index information is 0; deriving an intra prediction mode for a current block on the basis of the check for the planner flag information; deriving prediction samples for the current block on the basis of the intra prediction mode for the current block; and generating a reconstructed picture on the basis of the prediction samples.

14 Claims, 16 Drawing Sheets

(56) References Cited

U.S. PATENT DOCUMENTS

| | | | |
|---|---|---|---|
| 2015/0312590 A1* | 10/2015 | Thoreau | H04N 19/182 |
| | | | 375/240.12 |
| 2018/0098064 A1* | 4/2018 | Seregin | H04N 19/159 |
| 2018/0249153 A1* | 8/2018 | Kumakura | H04N 19/159 |
| 2018/0332284 A1* | 11/2018 | Liu | H04N 19/96 |
| 2019/0281289 A1* | 9/2019 | Zhao | H04N 19/11 |
| 2019/0306494 A1* | 10/2019 | Chang | H04N 19/159 |
| 2020/0014919 A1* | 1/2020 | Zhao | H04N 19/593 |
| 2020/0014920 A1* | 1/2020 | Zhao | H04N 19/146 |
| 2021/0051329 A1* | 2/2021 | Ko | H04N 19/70 |

* cited by examiner

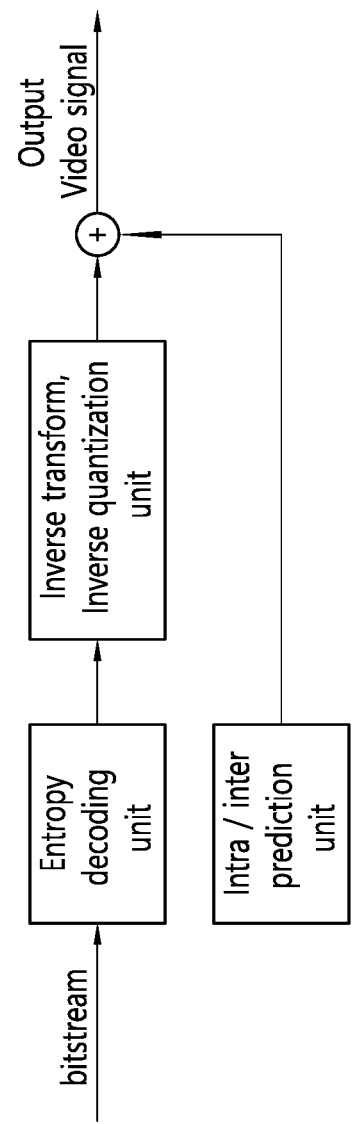

INTRA PREDICTION METHOD ON BASIS OF MPM LIST AND APPARATUS THEREFOR

CROSS REFERENCE TO RELATED APPLICATIONS

This application is Continuation application of U.S. patent application Ser. No. 17/442,912, filed Sep. 24, 2021, which is the National Stage filing under 35 U.S.C. 371 of International Application No. PCT/KR2020/003920, filed Mar. 23, 2020, which claims the benefit of U.S. Provisional Application No. 62/823,720, filed Mar. 29, 2019, the contents of which are all hereby incorporated by reference herein in their entirety.

BACKGROUND OF DISCLOSURE

Field of the Disclosure

This disclosure relates to image coding technology and, more particularly, to intra prediction method based on a Most Probable Mode (MPM) list and an apparatus therefor in an image coding system.

Related Art

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

This disclosure is to provide a method and apparatus for improving image coding efficiency.

This disclosure is also to provide a method and apparatus for improving efficiency of intra prediction.

This disclosure is still also to provide a method and apparatus which perform intra prediction based on the MPM list for the current block.

This disclosure is still also to provide a method and apparatus which perform an MPM list-based intra prediction based on multi-reference line (MRL) index information for at least one reference sample line for intra prediction of the current block.

This disclosure is still also to provide a method and apparatus which perform MPM list-based intra prediction based on the planar (PLANAR) flag information relating to whether or not to determine the intra prediction mode for the current block as the planar mode.

This disclosure is still also to provide a method and apparatus which determine whether or not to signal the planar flag information based on the MRL index information.

This disclosure is still also to provide a method and apparatus which construct the MPM list for the current block.

This disclosure is still also to provide a method and apparatus which determine a value of a context index for a bin associated with the planar flag information, based on whether or not an Intra Sub Partition (ISP) mode is applied to the current block.

According to an embodiment of this disclosure, an image decoding method performed by a decoding apparatus is provided. The method includes obtaining, from a bitstream, intra prediction information including at least one of MPM flag information relating to whether or not to derive an intra prediction mode for a current block based on most probable mode (MPM) candidates for the current block, multi-reference line (MRL) index information for at least one reference sample line for intra prediction of the current block, and planar (PLANAR) flag information relating to whether or not to determine the intra prediction mode for the current block to be a planar mode, checking the MPM flag information, checking the MRL index information based on a case in which the value of the MPM flag information indicates checking of the MRL index information, checking the planar flag information, based on a case in which the value of the MRL index information is 0, deriving the intra prediction mode for the current block, based on the checking of the planar flag information, deriving prediction samples for the current, block based on the intra prediction mode for the current block, and generating a reconstructed picture based on the prediction samples.

In an embodiment, the deriving the intra prediction mode for the current block may include deriving the intra prediction mode for the current block as the planar mode, based on a case in which the planar flag information indicates that the intra prediction mode for the current block is derived as the planar mode.

In an embodiment, the intra prediction information may further include MPM index information associated with one of the MPM candidates for the current block from which the planar mode has been excluded, wherein the deriving the intra prediction mode for the current block may include checking the MPM index information, based on a case in which the planar flag information indicates that the intra prediction mode for the current block is not derived as the planar mode, and deriving the intra prediction mode for the current block, based on a result of checking the MPM index information.

In an embodiment, the number of the MPM candidates for the current block from which the planar mode has been excluded may be five.

In an embodiment, the intra prediction mode for the current block may be derived based on the MPM candidates for the current block from which the planar mode has been excluded, and based on a case in which the value of the MRL index information indicates non-zero.

In an embodiment, the value of the planar flag information may be derived based on a context model for a bin associated with the planar flag information, the context model for a bin associated with the planar flag information may be derived based on a context index increment (ctxInc), the context index increment for the bin associated with the planar flag information is selected from two candidates, based on a case in which the bin index of the bin may be 0, the two candidates may include 0 and 1, the context model for a case in which the context index increment is 0 may be different from the context model for a case in which the context index increment is 1, the value of the context index increment for a bin associated with the planar flag information may be one of two different integers, and the two different integers may be 0 and 1.

In an embodiment, the value of the context index increment for the bin associated with the planar flag information may be based on whether or not an Intra Sub Partition (ISP) mode is applied to the current block.

In an embodiment, the value of the context index increment may be determined to be 1 based on determination that the ISP mode is applied to the current block, and the value of the context index increment may be determined to be 0 based on determination that the ISP mode is not applied to the current block.

According to another embodiment of this disclosure, a decoding apparatus for performing image decoding is provided. The decoding apparatus includes an entropy decoder which obtains, from a bitstream, intra prediction information including at least one of MPM flag information relating to whether or not to derive an intra prediction mode for a current block based on most probable mode (MPM) candidates for the current block, multi-reference line (MRL) index information for at least one reference sample line for intra prediction of the current block, and planar (PLANAR) flag information relating to whether or not to determine the intra prediction mode for the current block to be a planar mode, checks the MPM flag information, checks the MRL index information based on a check result that the value of the MPM flag information is associated with checking of the MRL index information, and check the planar flag information, based on a check result that the value of the MRL index information is 0, a predictor which derives the intra prediction mode for the current block, based on the checking of the planar flag information, and derives prediction samples for the current, block based on the intra prediction mode for the current block, and an adder generating a reconstructed picture based on the prediction samples.

In an embodiment, the intra prediction information may further include MPM index information associated with one of the MPM candidates for the current block from which the planar mode has been excluded, wherein a number of the MPM candidates for the current block from which the planar mode has been excluded may be five. The entropy decoder may check the MPM index information, based on a check result that the value of the planar flag information is associated with not deriving the intra prediction mode for the current block as the planar mode. The predictor may derive the intra prediction mode for the current block, based on a result of checking the MPM index information.

In an embodiment, the predictor may derive the intra prediction mode for the current block based on the MPM candidates for the current block from which the planar mode has been excluded, and based on a check result that the value of the MRL index information is not zero.

In an embodiment, the value of the context index increment for a bin associated with the planar flag information may be one of two different integers, the two different integers may be 0 and 1, and, the value of the context index increment for the bin associated with the planar flag information may be based on whether or not an Intra Sub Partition (ISP) mode is applied to the current block.

In an embodiment, the value of the context index increment may be determined to be 1 based on a determination that the ISP mode is applied to the current block, and the value of the context index increment may be determined to be 0 based on a determination that the ISP mode is not applied to the current block.

According to still another embodiment of this disclosure, an image encoding method performed by an encoding apparatus is provided. The image encoding method includes deriving an intra prediction mode for a current block, generating MPM flag information relating to whether or not to encode the intra prediction mode based on MPM candidates for the current block, generating the MRL index information, based on a case in which the MPM flag information indicates that it is associated with the multi-reference line (MRL) index information for at least one reference sample line for intra prediction of the current block, generating planar flag information relating to whether or not the derived intra prediction mode for the current block is a planar (PLANAR) mode, based on a check result that the value of the MRL index information is 0, and encoding image information including at least one of the MPM flag information, the MRL index information, and the planar flag information.

In an embodiment, the image encoding method may further include deriving MPM index information associated with one of the MPM candidates for the current block from which the planar mode has been excluded, based on determination that the value of the planar flag information is associated with that the intra prediction mode for the current block is not derived as the planar mode.

In an embodiment, the number of the MPM candidates for the current block from which the planar mode has been excluded may be five.

In an embodiment, the image encoding method may include deriving the intra prediction mode for the current block based on the MPM candidates for the current block from which the planar mode has been excluded, and based on a check result that the value of the MRL index information is not zero.

In an embodiment, the value of the context index for a bin associated with the planar flag information may be one of two different integers, and the two different integers may be 0 and 1.

In an embodiment, the value of the context index increment for the bin associated with the planar flag information may be based on whether or not an ISP mode is applied to the current block.

In an embodiment, the value of the context index increment may be determined to be 1 based on a determination that the ISP mode is applied to the current block, and the value of the context index increment may be determined to be 0 based on a determination that the ISP mode is not applied to the current block.

According to still another embodiment of this disclosure, an encoding apparatus for performing image encoding is provided. The encoding apparatus includes a predictor deriving an intra prediction mode for a current block, and an entropy encoder which generates MPM flag information relating to whether or not to encode the intra prediction mode based on MPM candidates for the current block, derives the MRL index information, based on determination that the value of the MPM flag information is associated with the multi-reference line (MRL) index information for at least one reference sample line for intra prediction of the current block, derives planar flag information relating to whether or not the derived intra prediction mode for the current block is a planar (PLANAR) mode, based on a check result that the value of the MRL index information is 0, and encodes image information including at least one of the MPM flag information, the MRL index information, and the planar flag information.

The image encoding apparatus according to an embodiment may derive MPM index information associated with one of the MPM candidates for the current block from which the planar mode has been excluded, based on a case in which the planar flag information indicates that the intra prediction mode for the current block is not derived as the planar mode.

In an embodiment, the number of the MPM candidates for the current block from which the planar mode has been excluded may be five.

The image encoding apparatus according to an embodiment may derive the intra prediction mode for the current block based on the MPM candidates for the current block from which the planar mode has been excluded, and based on a case in which the value of the MRL index information indicates non-zero.

In an embodiment, the value of the planar flag information may be derived based on a context model for a bin associated with the planar flag information, and the context model for a bin associated with the planar flag information may be derived based on a context index increment (ctxInc). The context index increment for the bin associated with the planar flag information may be selected from two candidates, based on a case in which the bin index of the bin may be 0. The candidates may include 0 and 1, and the context model for a case in which the context index increment is 0 may be different from the context model for a case in which the context index increment is 1. The value of the context index increment for a bin associated with the planar flag information may be one of two different integers, and the different two integers may be 0 and 1.

In an embodiment, the value of the context index increment for the bin associated with the planar flag information may be based on whether or not an ISP mode is applied to the current block.

In an embodiment, the value of the context index increment may be determined to be 1 based on a determination that the ISP mode is applied to the current block, and the value of the context index increment may be determined to be 0 based on a determination that the ISP mode is not applied to the current block.

According to still another embodiment of this disclosure, there is provided a decoder-readable storage medium which stores information on instructions that cause a video decoding apparatus to perform decoding methods according to some embodiments.

According to still another embodiment of this disclosure, there is provided a decoder-readable storage medium which stores information on instructions that cause a video decoding apparatus to perform decoding method according to an embodiment. The decoding method according to the embodiment includes obtaining, from a bitstream, intra prediction information including at least one of MPM flag information relating to whether or not to derive an intra prediction mode for a current block based on MPM candidates for the current block, MRL index information for at least one reference sample line for intra prediction of the current block, and planar flag information relating to whether or not to determine the intra prediction mode for the current block to be a planar mode, checking the MPM flag information, checking the MRL index information based on a check result that the value of the MPM flag information is associated with checking of the MRL index information, checking the planar flag information, based on a check result that the value of the MRL index information is 0, deriving the intra prediction mode for the current block, based on the checking of the planar flag information, deriving prediction samples for the current, block based on the intra prediction mode for the current block, and generating a reconstructed picture based on the prediction samples.

In an embodiment, the intra prediction information may further include MPM index information associated with one of the MPM candidates for the current block from which the planar mode has been excluded, wherein a number of the MPM candidates for the current block from which the planar mode has been excluded may be five. The deriving the intra prediction mode for the current block may include checking the MPM index information, based on a check result that the value of the planar flag information is associated with not deriving the intra prediction mode for the current block as the planar mode, and deriving the intra prediction mode for the current block, based on a result of checking the MPM index information.

The decoding method according to an embodiment may include deriving the intra prediction mode for the current block based on the MPM candidates for the current block from which the planar mode has been excluded, and based on a case in which the value of the MRL index information indicates non-zero.

In an embodiment, the value of the planar flag information may be derived based on a context model for a bin associated with the planar flag information, the context model for a bin associated with the planar flag information may be derived based on a context index increment (ctxInc), the context index increment for the bin associated with the planar flag information may be selected from two candidates, based on a case in which the bin index of the bin may be 0. The candidates may include 0 and 1, and the context model for a case in which the context index increment is 0 may be different from the context model for a case in which the context index increment is 1. The value of the context index increment for a bin associated with the planar flag information may be one of two different integers, and the different two integers may be 0 and 1. The value of the context index increment for the bin associated with the planar flag information may be based on whether or not an Intra Sub Partition (ISP) mode is applied to the current block.

In an embodiment, the value of the context index increment may be determined to be 1 based on determination that the ISP mode is applied to the current block. The value of the context index increment may be determined to be 0 based on determination that the ISP mode is not applied to the current block.

According to this disclosure, it is possible to improve overall image/video compression efficiency.

According to this disclosure, it is possible to improve the intra prediction efficiency.

According to this disclosure, it is possible to perform intra prediction efficiently based on an MPM list.

According to this disclosure, it is possible to increase the efficiency of MPM list-based intra prediction based on the MRL index information for at least one reference sample line for intra prediction of the current block.

According to this disclosure, it is possible to increase the efficiency of the MPM list-based intra prediction based on the planar flag information relating to whether or not to determine the intra prediction mode for the current block to be the planar mode.

According to this disclosure, it is possible to increase image coding efficiency by determining whether or not to signal planar flag information, based on MRL index information.

According to this disclosure, it is possible to efficiently construct the MPM list for the current block.

According to this disclosure, the value of the context index for the bin associated with the planar flag information may be determined based on whether or not the ISP mode is applied to the current block.

BRIEF DESCRIPTION OF THE DRAWINGS

FIGS. 4A and 4B are diagrams illustrating an example of an image encoding method performed by an encoding apparatus according to an embodiment, and an example of an image decoding method performed by a decoding apparatus according to an embodiment.

DESCRIPTION OF EMBODIMENTS

Figure 1:
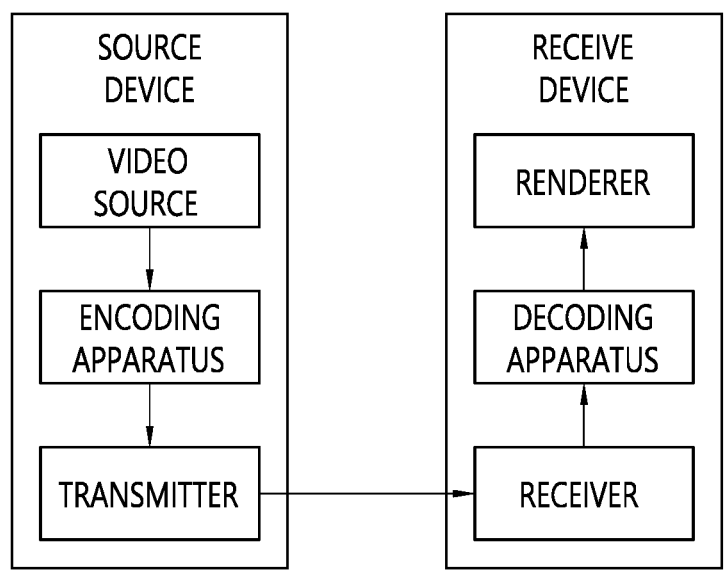
FIG. 1 schematically illustrates an example of a video/image coding system to which this disclosure may be applied.

The present disclosure may be modified in various forms, and specific embodiments thereof will be described and illustrated in the drawings. However, the embodiments are not intended for limiting the present disclosure. The terms used in the following description are used to merely describe specific embodiments, but are not intended to limit the present disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

In addition, each configuration of the drawings described in the present disclosure is an independent illustration for explaining functions as features that are different from each other, and does not mean that each configuration is implemented by mutually different hardware or different software. For example, two or more of the configurations can be combined to form one configuration, and one configuration can also be divided into multiple configurations. Without departing from the gist of the present disclosure, embodiments in which configurations are combined and/or separated are included in the scope of the present disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 illustrates an example of a video/image coding system to which the present disclosure may be applied.

The present disclosure relates to video/image coding. For example, a method/embodiment disclosed in the present disclosure may be applied to a method disclosed in the versatile video coding (VVC) standard, the essential video coding (EVC) standard, the AOMedia Video 1 (AV1) standard, the 2nd generation of audio video coding standard (AVS2) or the next generation video/image coding standard (e.g., H.267, H.268, or the like).

The present disclosure suggests various embodiments of video/image coding, and the above embodiments may also be performed in combination with each other unless otherwise specified.

In the present disclosure, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture (a brick may represent a rectangular region of CTU rows within a tile in a picture). A tile may be partitioned into a multiple bricks, each of which may be constructed with one or more CTU rows within the tile (A tile may be partitioned into multiple bricks, each of which consisting of one or more CTU rows within the tile). A tile that is not partitioned into multiple bricks may also be referred to as a brick. A brick scan may represent a specific sequential ordering of CTUs partitioning a picture, wherein the CTUs may be ordered in a CTU raster scan within a brick, and bricks within a tile may be ordered consecutively in a raster scan of the bricks of the tile, and tiles in a picture may be ordered consecutively in a raster scan of the tiles of the picture (A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture). A tile is a rectangular region of CTUs within a particular tile column and a particular tile row in a picture (A tile is a rectangular region of CTUs within a particular tile column and a particular tile row in a picture). The tile column is a rectangular region of CTUs, which has a height equal to the height of the picture and a width that may be specified by syntax elements in the picture parameter set (The tile column is a rectangular region of CTUs having a height equal to the height of the picture and a width specified by syntax elements in the picture parameter set). The tile row is a rectangular region of CTUs, which has a width specified by syntax elements in the picture parameter set and a height that may be equal to the height of the picture (The tile row is a rectangular region of CTUs having a height specified by syntax elements in the picture parameter set and a width equal to the width of the picture). A tile scan may represent a specific sequential ordering of CTUs partitioning a picture, and the CTUs may be ordered consecutively in a CTU raster scan in a tile, and tiles in a picture may be ordered consecutively in a raster scan of the tiles of the picture (A tile scan is a specific sequential ordering of CTUs partitioning a picture in which the CTUs are ordered consecutively in CTU raster scan in a tile whereas tiles in a picture are ordered consecutively in a raster scan of the tiles of the picture). A slice may include an integer number of bricks of a picture, and the integer number of bricks may be included in a single NAL unit (A slice includes an integer number of bricks of a picture that may be exclusively contained in a single NAL unit). A slice may be constructed with multiple complete tiles, or may be a consecutive sequence of complete bricks of one tile (A slice may consists of either a number of complete tiles or only a consecutive sequence of complete bricks of one tile). In the present disclosure, a tile group and a slice may be used in place of each other. For example, in the present disclosure, a tile group/tile group header may be referred to as a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

| A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present disclosure, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in the present disclosure should be interpreted to indicate "additionally or alternatively."

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
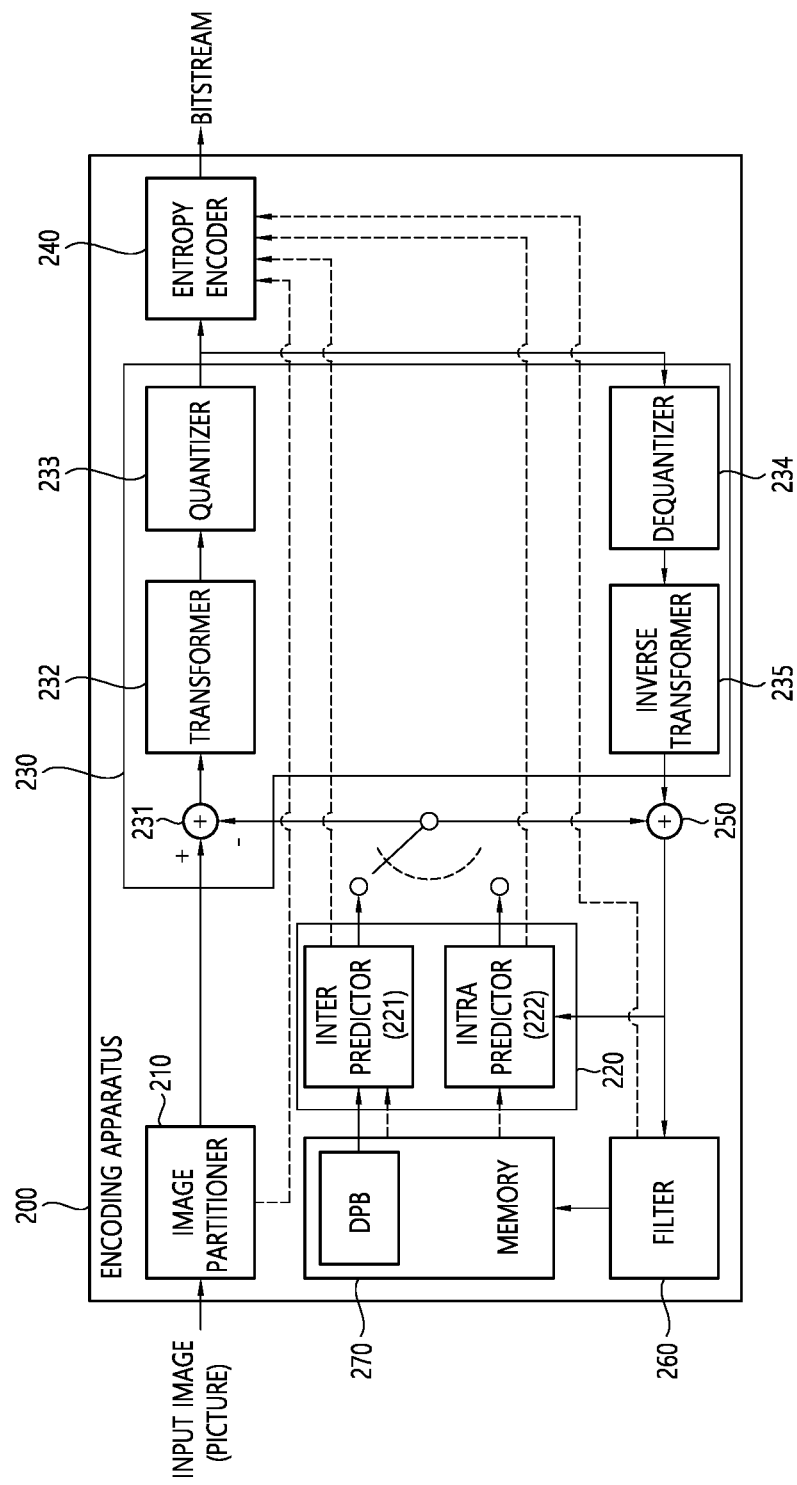
FIG. 2 is a diagram schematically illustrating a configuration of a video/image encoding apparatus to which this disclosure may be applied.

FIG. 2 is a diagram schematically illustrating a configuration of a video/image encoding apparatus to which the present disclosure may be applied. Hereinafter, what is referred to as the video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present disclosure may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may generate a residual signal (residual block, residual sample array) by subtracting a predicted signal (predicted block, prediction sample array) output from the inter predictor 221 or the intra predictor 222 from the input image signal (original block, original sample array), and the generated residual signal is transmitted to the transformer 232. In this case, as illustrated, the unit for subtracting the predicted signal (predicted block, prediction sample array) from the input image signal (original block, original sample array) within an encoder 200 may be called the subtractor 231. The predictor may perform prediction for a block to be processed (hereinafter, referred to as a current block), and generate a predicted block including prediction samples of the current block. The predictor may determine whether intra prediction is applied or inter prediction is applied in units of the current block or the CU. The predictor may generate various information about prediction, such as prediction mode information, to transfer the generated information to the entropy encoder 240 as described later in the description of each prediction mode. The information about prediction may be encoded by the entropy encoder 240 to be output in a form of the bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 200 may generate a predicted signal based on various prediction methods to be described later. For example, the predictor may not only apply the intra prediction or the inter prediction for predicting one block, but also simultaneously apply the intra prediction and the inter prediction. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, a sample value in a picture may be signaled based on information on a palette index and a palette table.

The predicted signal generated through the predictor (including the inter predictor 221 and/or the intra predictor 222) may be used to generate a reconstructed signal or used to generate a residual signal. The transformer 232 may generate transform coefficients by applying the transform technique to the residual signal. For example, the transform technique may include at least one of a discrete cosine transform (DCT), a discrete sine transform (DST), a Karhunen-Loève transform (KLT), a graph-based transform (GBT), or a conditionally non-linear transform (CNT). Here, when the relationship information between pixels is illustrated as a graph, the GBT means the transform obtained from the graph. The CNT means the transform which is acquired based on a predicted signal generated by using all previously reconstructed pixels. In addition, the transform process may also be applied to a pixel block having the same size of the square, and may also be applied to the block having a variable size rather than the square.

The quantizer 233 may quantize the transform coefficients to transmit the quantized transform coefficients to the entropy encoder 240, and the entropy encoder 240 may encode the quantized signal (information about the quantized transform coefficients) to the encoded quantized signal to the bitstream. The information about the quantized transform coefficients may be called residual information. The quantizer 233 may rearrange the quantized transform coefficients having a block form in a one-dimensional vector form based on a coefficient scan order, and also generate the information about the quantized transform coefficients based on the quantized transform coefficients of the one dimensional vector form. The entropy encoder 240 may perform various encoding methods, for example, such as an exponential Golomb coding, a context-adaptive variable length coding (CAVLC), and a context-adaptive binary arithmetic coding (CABAC). The entropy encoder 240 may also encode information (e.g., values of syntax elements and the like) necessary for reconstructing video/image other than the quantized transform coefficients together or separately. The encoded information (e.g., encoded video/image information) may be transmitted or stored in units of network abstraction layer (NAL) unit in a form of the bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. The signaled/transmitted information and/or syntax elements to be described later in the present disclosure may be encoded through the aforementioned encoding procedure and thus included in the bitstream. The bitstream may be transmitted through a network, or stored in a digital storage medium. Here, the network may include a broadcasting network and/or a communication network, or the like, and the digital storage medium may include various storage media such as USB, SD, CD, DVD, Blue-ray, HDD, and SSD. A transmitter (not illustrated) for transmitting the signal output from the entropy encoder 240 and/or a storage (not illustrated) for storing the signal may be configured as the internal/external elements of the encoding apparatus 200, or the transmitter may also be included in the entropy encoder 240.

The quantized transform coefficients output from the quantizer 233 may be used to generate a predicted signal. For example, the dequantizer 234 and the inverse transformer 235 apply dequantization and inverse transform to the quantized transform coefficients, such that the residual signal (residual block or residual samples) may be reconstructed. The adder 250 adds the reconstructed residual signal to the predicted signal output from the inter predictor 221 or the intra predictor 222, such that the reconstructed signal (reconstructed picture, reconstructed block, reconstructed sample array) may be generated. As in the case where the skip mode is applied, if there is no residual for the block to be processed, the predicted block may be used as the reconstructed block. The adder 250 may be called a reconstructor or a reconstructed block generator. The generated reconstructed signal may be used for the intra prediction of the next block to be processed within the current picture, and as described later, also used for the inter prediction of the next picture through filtering.

Meanwhile, a luma mapping with chroma scaling (LMCS) may also be applied in a picture encoding and/or reconstruction process.

The filter 260 may apply filtering to the reconstructed signal, thereby improving subjective/objective image qualities. For example, the filter 260 may apply various filtering methods to the reconstructed picture to generate a modified reconstructed picture, and store the modified reconstructed picture in the memory 270, specifically, the DPB of the memory 270. Various filtering methods may include, for example, a deblocking filtering, a sample adaptive offset, an adaptive loop filter, a bilateral filter, and the like. The filter 260 may generate various kinds of filtering-related information to transfer the generated information to the entropy encoder 240, as described later in the description of each filtering method. The filtering-related information may be encoded by the entropy encoder 240 to be output in a form of the bitstream.

The modified reconstructed picture transmitted to the memory 270 may be used as the reference picture in the inter predictor 221. If the inter prediction is applied by the inter predictor, the encoding apparatus may avoid the prediction mismatch between the encoding apparatus 200 and the decoding apparatus, and also improve coding efficiency.

The DPB of the memory 270 may store the modified reconstructed picture to be used as the reference picture in the inter predictor 221. The memory 270 may store motion information of the block in which the motion information within the current picture is derived (or encoded) and/or motion information of the blocks within the previously reconstructed picture. The stored motion information may be transferred to the inter predictor 221 to be utilized as motion information of the spatial neighboring block or motion information of the temporal neighboring block. The memory 270 may store the reconstructed samples of the reconstructed blocks within the current picture, and transfer the reconstructed samples to the intra predictor 222.

Figure 3:
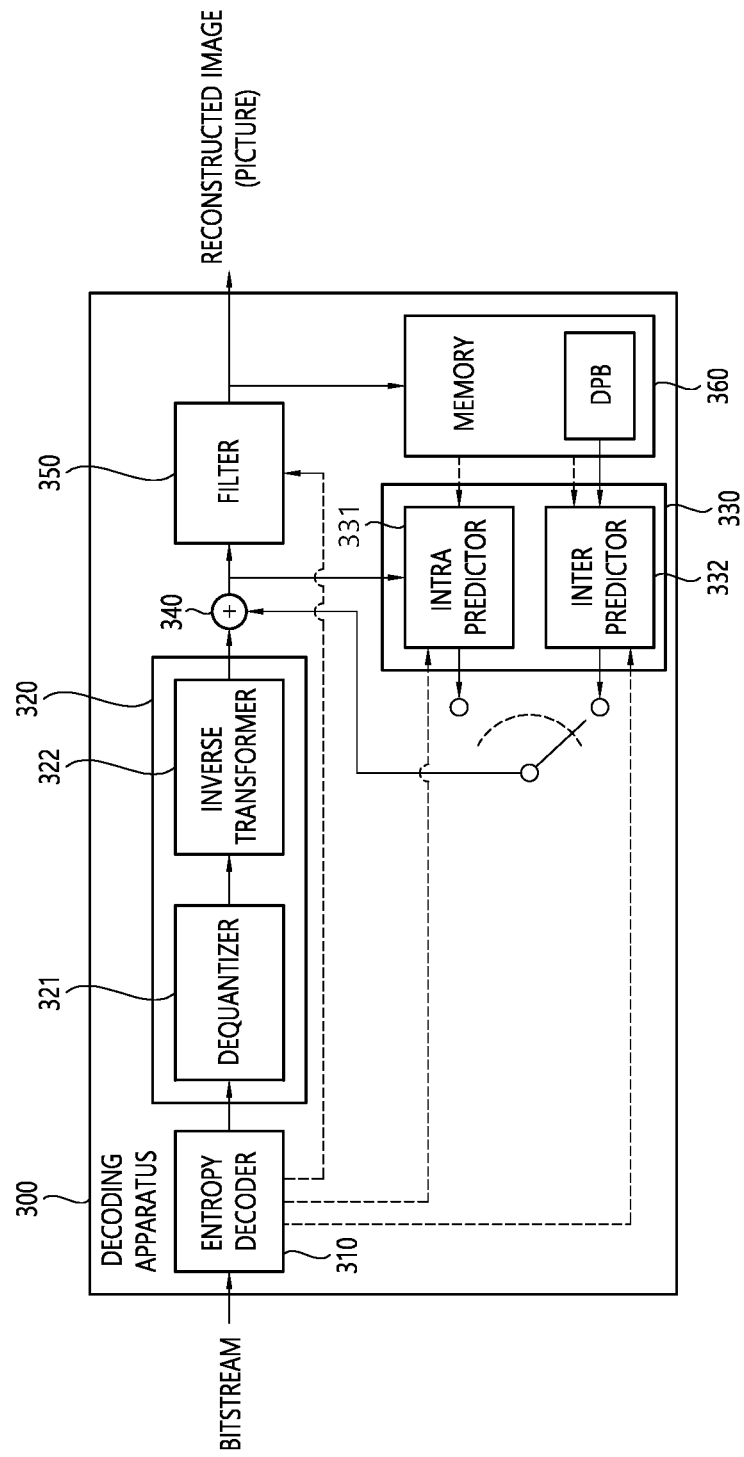
FIG. 3 is a diagram for schematically explaining a configuration of a video/image decoding apparatus to which this disclosure may be applied.

FIG. 3 is a diagram for schematically explaining a configuration of a video/image decoding apparatus to which the present disclosure is applicable.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive the signal output from the encoding apparatus illustrated in FIG. 2 in a form of the bitstream, and the received signal may be decoded through the entropy decoder 310. For example, the entropy decoder 310 may derive information (e.g., video/image information) necessary for the image reconstruction (or picture reconstruction) by parsing the bitstream. The video/image information may further include information about various parameter sets such as an adaptation parameter set (APS), a picture parameter set (PPS), a sequence parameter set (SPS), and a video parameter set (VPS). In addition, the video/image information may further include general constraint information. The decoding apparatus may decode the picture further based on the information about the parameter set and/or the general constraint information. The signaled/received information and/or syntax elements to be described later in the present disclosure may be decoded through the decoding procedure and acquired from the bitstream. For example, the entropy decoder 310 may decode information within the bitstream based on a coding method such as an exponential Golomb coding, a CAVLC, or a CABAC, and output a value of the syntax element necessary for the image reconstruction, and the quantized values of the residual-related transform coefficient. More specifically, the CABAC entropy decoding method may receive a bin corresponding to each syntax element from the bitstream, determine a context model using syntax element information to be decoded and decoding information of the neighboring block and the block to be decoded or information of the symbol/bin decoded in the previous stage, and generate a symbol corresponding to a value of each syntax element by predicting the probability of generation of the bin according to the determined context model to perform the arithmetic decoding of the bin. At this time, the CABAC entropy decoding method may determine the context model and then update the context model using the information of the decoded symbol/bin for a context model of a next symbol/bin. The information about prediction among the information decoded by the entropy decoder 310 may be provided to the predictor (the inter predictor 332 and the intra predictor 331), and a residual value at which the entropy decoding is performed by the entropy decoder 310, that is, the quantized transform coefficients and the related parameter information may be input to the residual processor 320. The residual processor 320 may derive a residual signal (residual block, residual samples, and residual sample array). In addition, the information about filtering among the information decoded by the entropy decoder 310 may be provided to the filter 350. Meanwhile, a receiver (not illustrated) for receiving the signal output from the encoding apparatus may be further configured as the internal/external element of the decoding apparatus 300, or the receiver may also be a component of the entropy decoder 310. Meanwhile, the decoding apparatus according to the present disclosure may be called a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate the predicted signal based on various prediction methods to be described later. For example, the predictor may not only apply the intra prediction or the inter prediction for the prediction of one block, but also apply the intra prediction and the inter prediction at the same time. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, information on a palette table and a palette index may be included in the video/image information and signaled.

The intra predictor 331 may predict the current block with reference to the samples within the current picture. The referenced samples may be located neighboring to the current block according to the prediction mode, or may also be located away from the current block. The prediction modes in the intra prediction may include a plurality of non-directional modes and a plurality of directional modes. The intra predictor 331 may also determine the prediction mode applied to the current block using the prediction mode applied to the neighboring block.

The inter predictor 332 may induce the predicted block of the current block based on the reference block (reference sample array) specified by the motion vector on the reference picture. At this time, in order to decrease the amount of the motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. For example, the inter predictor 332 may configure a motion information candidate list based on the neighboring blocks, and derive the motion vector and/or the reference picture index of the current block based on received candidate selection information. The inter prediction may be performed based on various prediction modes, and the information about the prediction may include information indicating the mode of the inter prediction of the current block.

The adder 340 may add the acquired residual signal to the predicted signal (predicted block, prediction sample array) output from the predictor (including the inter predictor 332 and/or the intra predictor 331) to generate the reconstructed signal (reconstructed picture, reconstructed block, reconstructed sample array). As in the case where the skip mode is applied, if there is no residual for the block to be processed, the predicted block may be used as the reconstructed block.

The adder 340 may be called a reconstructor or a reconstructed block generator. The generated reconstructed signal may be used for the intra prediction of a next block to be processed within the current picture, and as described later, may also be output through filtering or may also be used for the inter prediction of a next picture.

Meanwhile, a luma mapping with chroma scaling (LMCS) may also be applied in the picture decoding process.

The filter 350 may apply filtering to the reconstructed signal, thereby improving the subjective/objective image qualities. For example, the filter 350 may apply various filtering methods to the reconstructed picture to generate a modified reconstructed picture, and transmit the modified reconstructed picture to the memory 360, specifically, the DPB of the memory 360. Various filtering methods may include, for example, a deblocking filtering, a sample adaptive offset, an adaptive loop filter, a bidirectional filter, and the like.

The (modified) reconstructed picture stored in the DPB of the memory 360 may be used as the reference picture in the inter predictor 332. The memory 360 may store motion information of the block in which the motion information within the current picture is derived (decoded) and/or motion information of the blocks within the previously reconstructed picture. The stored motion information may be transferred to the inter predictor 260 to be utilized as motion information of the spatial neighboring block or motion information of the temporal neighboring block. The memory 360 may store the reconstructed samples of the reconstructed blocks within the current picture, and transfer the stored reconstructed samples to the intra predictor 331.

In the present specification, the exemplary embodiments described in the filter 260, the inter predictor 221, and the intra predictor 222 of the encoding apparatus 200 may be applied equally to or to correspond to the filter 350, the inter predictor 332, and the intra predictor 331 of the decoding apparatus 300, respectively.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Figure 4A:
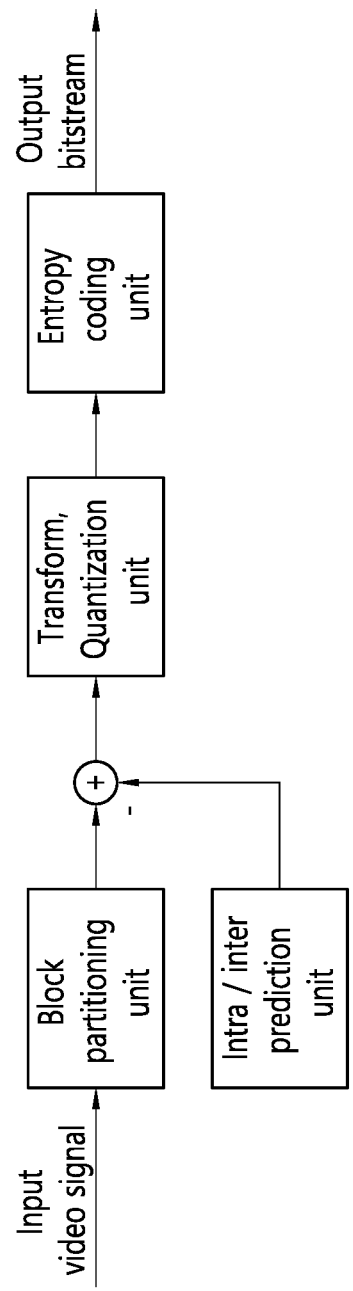

FIGS. 4A and 4B are diagrams illustrating an example of an image encoding method performed by an encoding apparatus according to an embodiment, and an example of an image decoding method performed by a decoding apparatus according to an embodiment.

FIG. 4A illustrates an example of an image encoding method performed by a video encoding apparatus. Referring to FIG. 4A, the image encoding method may include block partitioning, intra/inter prediction, transform, quantization, and entropy encoding processes. For example, the current picture may be partitioned into a plurality of blocks, a prediction block of the current block may be generated through intra/inter prediction, and a residual block of the current block may be generated by subtracting the input block of the current block and the prediction block. Thereafter, a coefficient block, i.e., transform coefficients of the current block, may be generated by transforming the residual block. The transform coefficients may be quantized and entropy encoded and stored in a bitstream.

FIG. 4B illustrates an example of an image decoding method performed by a decoding apparatus. Referring to FIG. 4B, the image decoding method may include entropy decoding, inverse quantization, inverse transform, and intra/inter prediction processes. For example, the decoding apparatus may perform the reverse process of the encoding method. Specifically, quantized transform coefficients may be obtained through the entropy decoding of the bitstream, and a coefficient block of the current block, i.e., transform coefficients, may be obtained through the inverse quantization process of the quantized transform coefficients. A residual block of the current block may be derived through the inverse transform of the transform coefficients, and a reconstructed block of the current block may be derived through addition of the prediction block of the current block derived through intra/inter prediction and the residual block.

Figure 5:
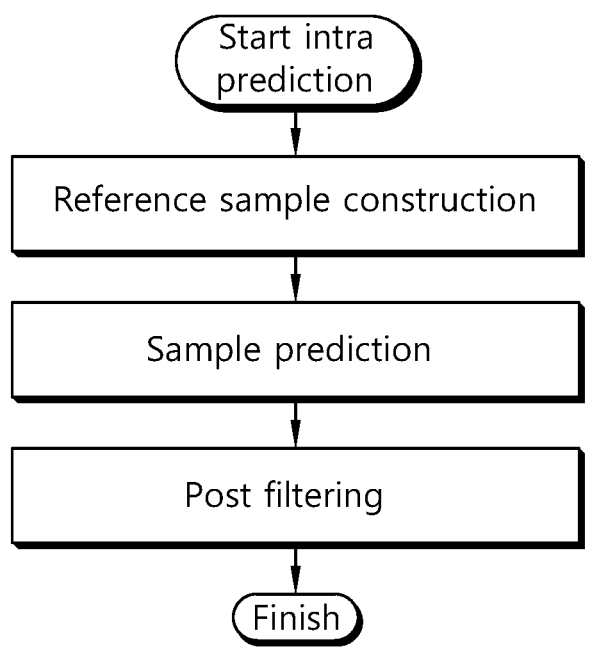
FIG. 5 is a flowchart illustrating an intra prediction method according to an embodiment.

FIG. 5 is a flowchart illustrating an intra prediction method according to an embodiment.

As shown in FIG. 5, the intra prediction method according to an embodiment may include the following three steps. That is, the intra prediction method according to an embodiment may include a reference sample construction step, a sample prediction step, and a post-filtering step. In the sample prediction step, the intra prediction method according to the embodiment may use known neighboring reference samples and an intra prediction mode to perform prediction on unknown samples.

Figure 6:
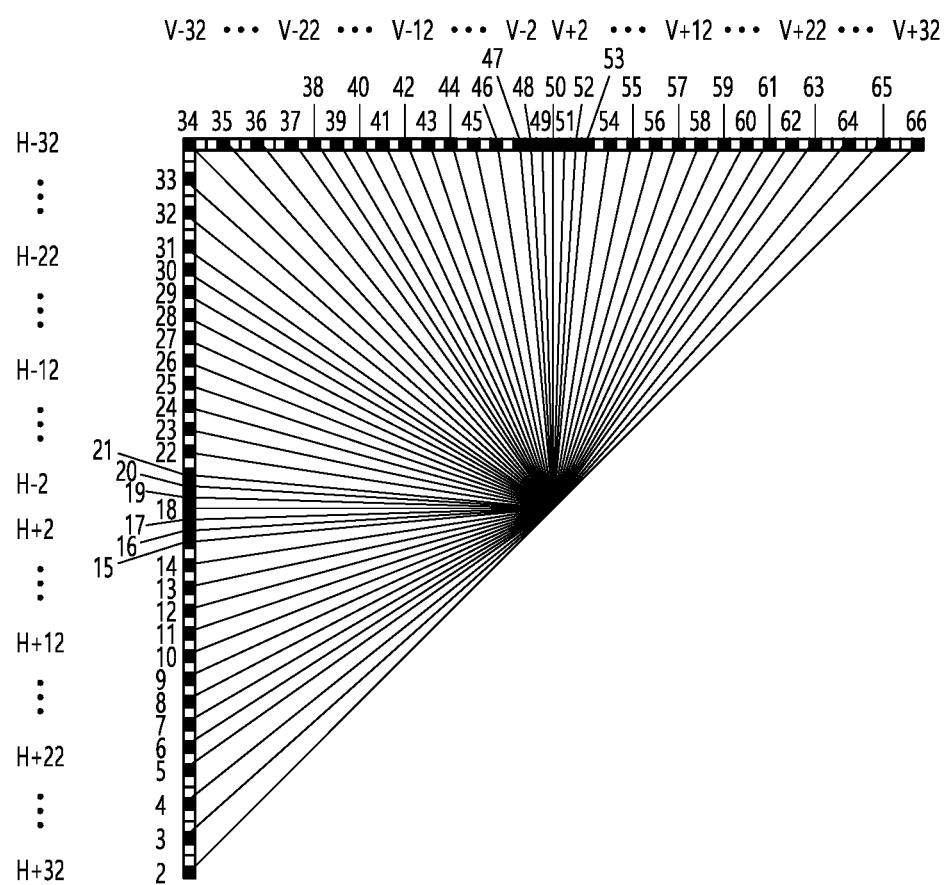
FIG. 6 is a diagram illustrating an example of directional intra prediction modes.

FIG. 6 is a diagram illustrating an example of directional intra prediction modes.

When intra prediction is applied to the current block, the encoding apparatus and/or the decoding apparatus according to an embodiment may derive an intra prediction mode for the current block, and derive prediction samples for the current block based on the intra prediction mode. That is, the encoding apparatus and/or the decoding apparatus may derive prediction samples for the current block by enabling a directional intra prediction mode or a non-directional intra prediction mode based on neighboring reference samples of the current block.

In an example, the intra prediction modes may include two non-directional (or non-angular) intra prediction modes and 65 directional (or angular) intra prediction modes. The non-directional intra prediction modes may include a No. 0 planar intra prediction mode, and a No. 1 DC intra prediction mode, and the directional intra prediction modes may include 65 intra prediction modes between a No. 2 intra prediction mode and a No. 66 intra prediction mode. Intra prediction based on the 65 directional intra prediction modes may be applied to blocks of all sizes, and may be applied to both a luma component and a chroma component. However, this is only an example, and configurations of intra prediction modes may be different.

Alternatively, the intra prediction mode may include two non-directional intra prediction modes and 129 directional intra prediction modes. The non-directional intra prediction modes may include a planar intra prediction mode, and a DC intra prediction mode, and the directional intra prediction modes may include a No. 2 to a No. 130 intra prediction modes.

Meanwhile, the intra prediction mode may further include a cross-component linear model (CCLM) mode for the chroma sample in addition to the above-described intra prediction modes. The CCLM mode may be classified into LT_CCLM, L_CCLM, and T_CCLM depending on whether left samples are considered, top samples are considered, or both are considered to derive LM parameters, and may be applied only to a chroma component.

The intra prediction mode may be indexed, for example, as shown in Table 1 below.

TABLE 1

| Intra prediction mode | Associated name |
|---|---|
| 0 | INTRA_PLANAR |
| 1 | INTRA_DC |
| 2 . . . 66 | INTRA_ANGULAR2 . . . INTRA_ANGULAR66 |
| 81 . . . 33 | INTRA_LT_CCLM, INTRA_L_CCLM, INTRA_T_CCLM |

Meanwhile, the intra prediction type (or additional intra prediction mode, etc.) may include at least one of the above-described LIP, PDPC, MRL, and ISP. The intra prediction type may be indicated based on intra prediction type information, and the intra prediction type information may be implemented in various forms. In one example, the intra prediction type information may include intra prediction type index information indicating one of the intra prediction types. In another example, the intra prediction type information may include at least one of reference sample line information related to whether the MRL is applied to the current block and, if applied, which reference sample line is used (e.g., intra_luma_ref_idx), ISP flag information related to whether the ISP is applied to the current block (e.g., intra_subpartitions_split_flag), flag information related to whether PDCP is applied, or flag information related to whether LIP is applied.

Referring to FIG. 6, it is possible to distinguish an intra prediction mode having a horizontal directionality from an intra prediction mode having a vertical directionality around a No. 34 intra prediction mode having a left upward diagonal prediction direction. H and V of FIG. 6 mean horizontal directionality and vertical directionality, respectively, and numerals −32 to 32 indicate displacements in 1/32 units on the sample grid position. The Nos. 2 to 33 intra prediction modes have the horizontal directionality, and the Nos. 34 to 66 intra prediction modes have the vertical directionality. The No. 18 intra prediction mode and the No. 50 intra prediction mode may be a horizontal intra prediction mode and a vertical intra prediction mode, respectively; the No. 2 intra prediction mode may be called a left downward diagonal intra prediction mode; the No. 34 intra prediction mode may be called a left upward diagonal intra prediction mode; and the No. 66 intra prediction mode may be called a right upward diagonal intra prediction mode.

In general, when an image is divided into blocks, a current block to be coded and a neighboring block have similar image characteristics. Therefore, it is highly likely that the current block and the neighboring block have the same or similar intra prediction modes. Accordingly, the encoder may use the intra prediction mode of the neighboring block to encode the intra prediction mode of the current block.

More specifically, the decoding apparatus may derive a most probable mode (MPM) list based on an intra prediction mode of a neighboring block (e.g., a left neighboring block and/or a top neighboring block) of the current block and additional candidate modes, and may select one of the MPM candidates in the derived MPM list based on the received MPM index, or may select one of the remaining intra prediction modes not included in the MPM candidates based on remaining intra prediction mode information. The MPM list may be referred to as an intra prediction mode candidate list or may be represented as candModeList.

When the neighboring block is intra-coded, the encoding apparatus (or encoder) may check or derive the prediction mode of the neighboring block. For example, the prediction mode of the current block may be determined based on the prediction mode of the left neighboring block and the prediction mode of the top neighboring block, and in this case, the prediction mode of the corresponding neighboring block may be determined as Most Probable Modes (MPM). Determining the MPM may be expressed as a list up of the MPM (most probable modes) candidates (or MPM list).

The encoding apparatus may check whether or not the prediction mode of the left neighboring block is the same as the prediction mode of the top neighboring block. The initial MPM list may be formed by performing a pruning process on intra prediction modes of the two adjacent blocks.

If the prediction mode of the left neighboring block and the prediction mode of the top neighboring block are not the same, then the first MPM may be set as the prediction mode of the left neighboring block, the second MPM may be set as the prediction mode of the top neighboring block, and the third MPM may be set as any one of the intra planar mode, the intra DC mode, and the intra vertical mode (No. 50 intra prediction mode). Specifically, if the intra prediction modes of the two neighboring blocks are different from each other, the two intra prediction modes may be set as the MPM, and one of the default intra modes after the pruning check by the MPMs may be added to the MPM list. Here, the default intra modes may include an intra planar mode, an intra DC mode, and/or an intra vertical mode (No. 50 intra prediction mode).

In an example, the MPM list may include 3 MPM candidates, 5 candidates, or 6 MPM candidates. As one example, the MPM list may include candidates derived based on an intra prediction mode of a neighboring block, a derived intra prediction mode, and/or a default intra prediction mode. The encoding apparatus/decoding apparatus may search neighboring blocks of the current block in a specific order, and may derive the intra prediction mode of the neighboring block as the MPM candidate in the derived order. For example, the neighboring blocks may include a left neighboring block, a top neighboring block, a bottom-left neighboring block, a top-right neighboring block, and a top-left neighboring block.

In one example, an MPM list including three MPM candidates may be constructed, and the three MPM candidates may be derived based on the intra prediction modes of the neighboring block F and the neighboring block G. An MPM prediction method based on neighboring blocks for the current block including the neighboring block F and the neighboring block G may be, for example, as shown in FIG. 7 below.

Figure 7:
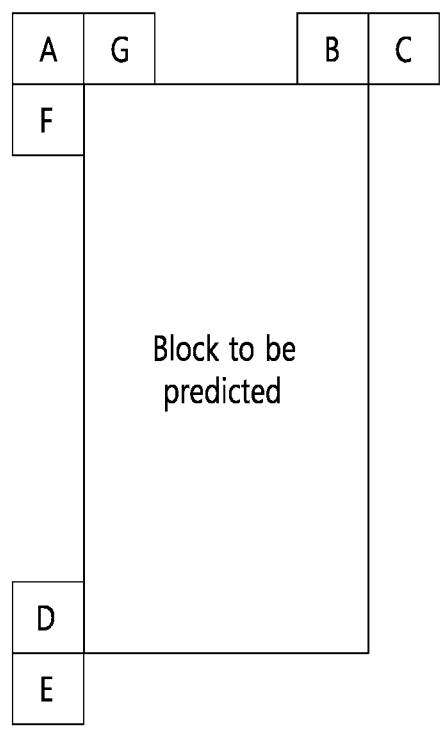
FIG. 7 is a diagram for explaining the construction of an MPM list according to an embodiment.

FIG. 7 is a diagram for explaining the construction of an MPM list according to an embodiment.

Referring to FIG. 7, the neighboring blocks of the current block may include a neighboring block A, a neighboring block B, a neighboring block C, a neighboring block D, a neighboring block E, a neighboring block F, and/or a neighboring block G.

The neighboring block A may represent a neighboring block located top left of a top-left sample position of the current block; the neighboring block B, a neighboring block located top of a top-right sample position of the current block; the neighboring block C, a neighboring block located top right of the top-right sample position of the current block; the neighboring block D, a neighboring block located left of the bottom-left sample position of the current block; the neighboring block E, a neighboring block located bottom left of the bottom-left sample position of the current block; the neighboring block G, a neighboring block located top of the top-left sample position of the current block; and the neighboring block F, a neighboring block located left of the top-left sample position of the current block.

Additionally, for example, when the size of the current block is W×H, and an x component of a top-left sample position of the current block is 0 and a y component thereof is 0, then the neighboring block A is a block including a sample at coordinates (−1, −1); the neighboring block B is a block including a sample at coordinates (W−1, −1); the neighboring block C is a block including a sample at coordinates (W, −1); the neighboring block D is a block including a sample at coordinates (−1, H−1); the neighboring block E is a block including a sample at coordinates (−1, H); the neighboring block F is a block including a sample at coordinates (−1, 0); and the neighboring block G is a block including a sample at coordinates (0, −1).

In an embodiment, three MPM candidates may be derived based on the intra prediction mode of the neighboring block F and the intra prediction mode of the neighboring block G. For example, the intra prediction mode of the neighboring block F and the intra prediction mode of the neighboring block G may be derived. Meanwhile, in the following three cases, the intra prediction mode of the neighboring block F or the intra prediction mode of the neighboring block G may be derived as a DC intra prediction mode. That is, if the neighboring block F or the neighboring block G is not available, if the neighboring block F or the neighboring block G is not coded in the intra prediction mode (if the neighboring block F or the neighboring block G is not the intra-coded block), or if the neighboring block F or the neighboring block G departs from the current coding tree unit, then the intra prediction mode of the neighboring block F or the intra prediction mode of the neighboring block G may be derived as a DC intra prediction mode.

If the intra prediction mode of the neighboring block F or the intra prediction mode of the neighboring block G is determined, the three MPM candidates may be derived, for example, based on Table 2 below.

TABLE 2

```
if (intra mode of F and G are equal)
{
    if (intra mode of F < intra mode 2)
    { MPM list1 }
    else
    { MPM list2 }
}
else
{
    if (Neither intra mode of F nor G are intra mode Planar)
    { MPM list3 }
    else if (intra mode of (F+G) <intra mode 2)
    { MPM list4 }
    else
    { MPM list5 }
}
```

Table 2 may exemplarily show pseudo codes constructing the MPM list.

Referring to Table 2, it may be determined whether or not the intra prediction mode of the neighboring block F and the intra prediction mode of the neighboring block G are the same.

If the intra prediction mode of the neighboring block F and the intra prediction mode of the neighboring block G are the same, and the mode number of the intra prediction mode of the neighboring block F is less than 2, then the MPM list of the current block may be derived as MPM list 1 (MPM list1). That is, if the intra prediction mode of the neighboring block F and the intra prediction mode of the neighboring block G are the same, and the intra prediction mode of the neighboring block F is No. 0 intra prediction mode or No. 1 intra prediction mode, then the MPM list of the current block may be derived as MPM list 1. Here, said MPM list 1 may be an MPM list constructed with MPM candidates {F, F−1, F+1}. The F may indicate the intra prediction mode of the neighboring block F, and F−1 may indicate an intra prediction mode whose mode number is a value obtained by subtracting 1 from the mode number of the intra prediction mode of the neighboring block F, and F+1 may indicate an intra prediction mode whose mode number is a value obtained by adding 1 to the mode number of the intra prediction mode of the neighboring block F. For example, if the intra prediction mode of the neighboring block F is No. N intra prediction mode, then the MPM list 1 may be constructed with an MPM list including No. N intra prediction mode, No. N−1 intra prediction mode, and No. N+1 intra prediction mode as MPM candidates.

Further, if the intra prediction mode of the neighboring block F and the intra prediction mode of the neighboring block G are the same, and the mode number of the intra prediction mode of the neighboring block F is not less than 2, then the MPM list of the current block may be derived as MPM list 2.

Additionally, if the intra prediction mode of the neighboring block F and the intra prediction mode of the neighboring block G are not the same, and the intra prediction mode of the neighboring block F and the intra prediction mode of the neighboring block G are not the planar intra prediction mode, then the MPM list of the current block may be derived as MPM list 3.

Additionally, if the intra prediction mode of the neighboring block F and the intra prediction mode of the neighboring block G are not the same, and the sum of the mode number of the intra prediction mode of the neighboring block F and the mode number of the intra prediction mode of the neighboring block G is less than 2, then the MPM list of the current block may be derived as MPM list 4.

Additionally, if the intra prediction mode of the neighboring block F and the intra prediction mode of the neighboring block G are not the same, and at least one of the intra prediction mode of the neighboring block F and the intra prediction mode of the neighboring block G is a planar intra prediction mode, and the sum of the mode number of the intra prediction mode of the neighboring block F and the mode number of the intra prediction mode of the neighboring block G is not less than 2, then the MPM list of the current block may be derived as MPM list 5.

Meanwhile, as the number of intra prediction modes increases, the number of MPM candidates needs to increase. Accordingly, the number of MPM candidates may differ according to the number of intra prediction modes. In general, as the number of intra prediction modes increases, the number of MPM candidates may increase. However, it is not always the case that, as the number of intra prediction modes increases, the number of MPM candidates increase. For example, when there are 35 intra prediction modes or when there are 67 intra prediction modes, there may be various numbers, such as 3, 4, 5, or 6, of MPM candidates according to a design.

For example, the encoder/decoder may construct an MPM list including 6 MPMs. In order to construct the MPM list, the default intra modes, neighbor intra modes, and derived intra modes may be considered.

In an example, for the neighbour intra modes, two neighboring blocks, that is, a left neighboring block A and a top neighboring block B may be considered. In order to generate an MPM list including 6 MPMs, an initialized default MPM list based on Table 3 below may be considered.

TABLE 3

Default 6 MPM modes = {A, Planar (0) or DC (1), Vertical (50), HOR (18), VER − 4 (46), VER + 4 (54)}
After that 6 MPM modes are updated performing pruning process for two neighboring intra modes. If two neighboring modes are the same each other and the neighboring mode is greater than DC (1) mode, 6 MPM modes are to include three default modes (A, Planar, DC) and three derived modes which are obtained by adding predefined offset values to the neighboring mode and performing modular operation. Otherwise, if two neighboring modes are different, two neighboring modes are assigned to first two MPM modes and the rest four MPM modes are derived from default modes and neighboring modes. During 6 MPM list generation process, pruning is used to remove duplicated modes so that only unique modes can be included into the MPM list. For entropy coding of the 61 non-MPM modes, a Truncated Binary Code (TBC) is used.

In another example, the order of constructing the six MPM candidates may be in the order of the neighboring block D, the neighboring block B, the planar intra prediction mode, the DC intra prediction mode, the neighboring block E, the neighboring block C, and the neighboring block A. That is, the intra prediction mode of the neighboring block D, the intra prediction mode of the neighboring block B, the planar intra prediction mode, the DC intra prediction mode, the intra prediction mode of the neighboring block E, the intra prediction mode of the neighboring block C, and the intra prediction mode of block A may be derived in this order as an MPM candidate, and if it is the same as the already derived intra prediction mode, it may not be derived as an MPM candidate.

Additionally, when the MPM list does not include the maximum number of MPM candidates, that is, when the number of derived MPM candidates is smaller than the maximum number of candidates, a directional intra prediction mode adjacent to the derived MPM candidate and a predefined default intra prediction mode may be considered as an MPM candidate, and a pruning check process may be performed together. Here, the directional intra prediction mode adjacent to the MPM candidate may indicate an intra prediction mode whose mode number is adjacent to that of the MPM candidate. Although the above-described neighboring block search and continuous pruning check has the advantage of saving bit transmission rate, it may increase the number of hardware operation cycles for MPM list construction of each block. The worst-case scenario may be that a 3840×2160 4K image is divided into 4×4 size blocks for intra prediction, and the increased hardware operation cycle for each 4×4 size block may be considered important for throughput. On the other hand, when the neighboring block coded by inter prediction of the current block knows the intra prediction mode of the neighboring block, the intra prediction mode of the neighboring block may be used to construct the MPM list.

As described above, in general, the current block to be coded and the neighboring block may have similar image characteristics, and thus, since the current block and the neighboring block have a high probability of having the same or similar intra prediction modes, the MPM list of the current block may be determined in order to derive an intra prediction mode applied to the current block. However, if 67 intra prediction modes are used for intra prediction, an MPM list including 3 MPM candidates may not be sufficient to indicate diversity of multiple intra prediction modes. In addition, a method of constructing a 6 MPM list including a neighboring block search and pruning check process may be disadvantageous in terms of complexity and throughput. In this disclosure, various methods for deriving an intra prediction mode for a current block based on MPM prediction will be described later.

Figure 8:
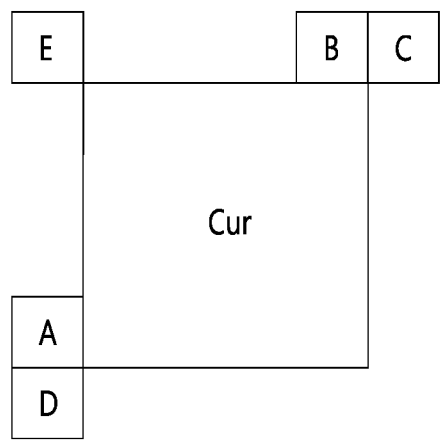
FIG. 8 is a diagram for explaining the construction of an MPM list according to another embodiment.

FIG. 8 is a diagram for explaining the construction of an MPM list according to another embodiment.

Referring to FIG. 8, in an embodiment, A, which is a left neighboring block (which may be denoted as LEFT), and B, which is a top neighboring block (which may be denoted as ABOVE), may be used as in Table 4 below to generate the MPM list. The algorithm is as follows. Non MPM coding may be based on a truncated binary code.

TABLE 4

Determine LEFT and ABOVE intra modes
Set MPM as MPM_ordering_0
If (LEFT==ABOVE)
 If (LEFT>=DC_idx and ABOVE>DC_idx), then set MPM as MPM_ordering_2
 Else if (LEFT+ABOVE>DC_idx), then set MPM as MPM_ordering_3

Figure 9:
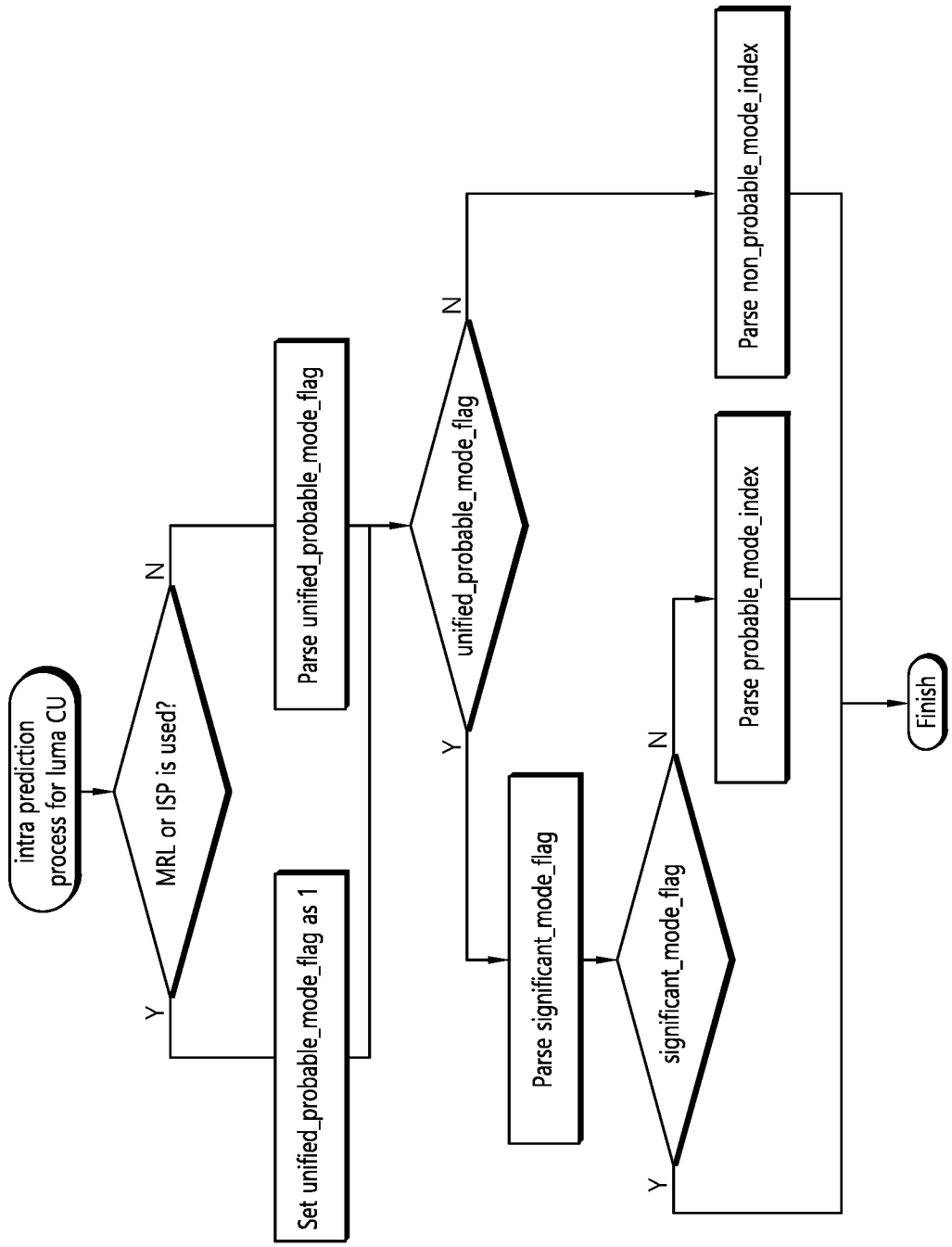
FIG. 9 is a flowchart showing an MPM prediction method according to an embodiment.

FIG. 9 is a flowchart showing an MPM prediction method according to an embodiment.

In this disclosure, a specific term or sentence is used for defining a specific information or concept. For example, in the luma intra coding process, a specific intra prediction mode that can be determined as the intra prediction mode for the current block without MPM index information is referred to as a "significant mode," and an index indicating one of the MPM candidates included in the MPM list is referred to as an "MPM index", and a flag indicating whether or not the luma intra coding is applied is referred to as an "unified MPM flag", and, when MPM prediction is not applied, the remaining intra prediction modes except for MPM candidates are referred to as "non-MPM modes". However, "significant mode" may be replaced with various terms such as significant_mode, a default mode, a candidate mode, or the like, and the "MPM index" may be replaced with probable_mode_index, mpm_idx, intra_luma_mpm_idx, or the like, and the "unified MPM flag" may be replaced by unified_probable_mode_flag, MPM flag, intra_luma_mpm_flag, or the like, and the "Non-MPM mode" may be replaced with various terms, such as non MPM mode, non_probable_mode, remaining intra prediction modes, and MPM remaining prediction modes. Therefore, when interpreting specific terms or sentences used to define specific information or concepts herein throughout the description, interpretations limited to the names should not be made, and the term needs to be interpreted under the consideration of various operations, functions, and effects according to the contents which the term intends to express.

In one example, the signature mode may be an intra planar (PLANAR) mode.

In an embodiment, unified luma intra coding and signaling may be performed. In the luma intra coding, at least one significant luma intra mode may be signaled first, and an MPM list may be then constructed based on the remaining intra modes, so that a best mode may be selected from among MPM candidates included in the MPM list.

First, it may be determined whether MRL or ISP is used. When MRL or ISP is used, the value of unified_probable_mode_flag may be determined to be 1. If MRL or ISP is not used, unified_probable_mode_flag may be parsed.

If the value of unified_probable_mode_flag is 0, non_probable_mode_index may be parsed. If the value of unified_probable_mode_flag is 1, significant_mode_flag may be parsed. If the value of significant_mode_flag is 1, the intra prediction mode for the current block may be determined to be a signature mode (e.g., intra planar mode), while, if the value of significant_mode_flag is 0, probable_mode_index may be parsed.

Figure 10:
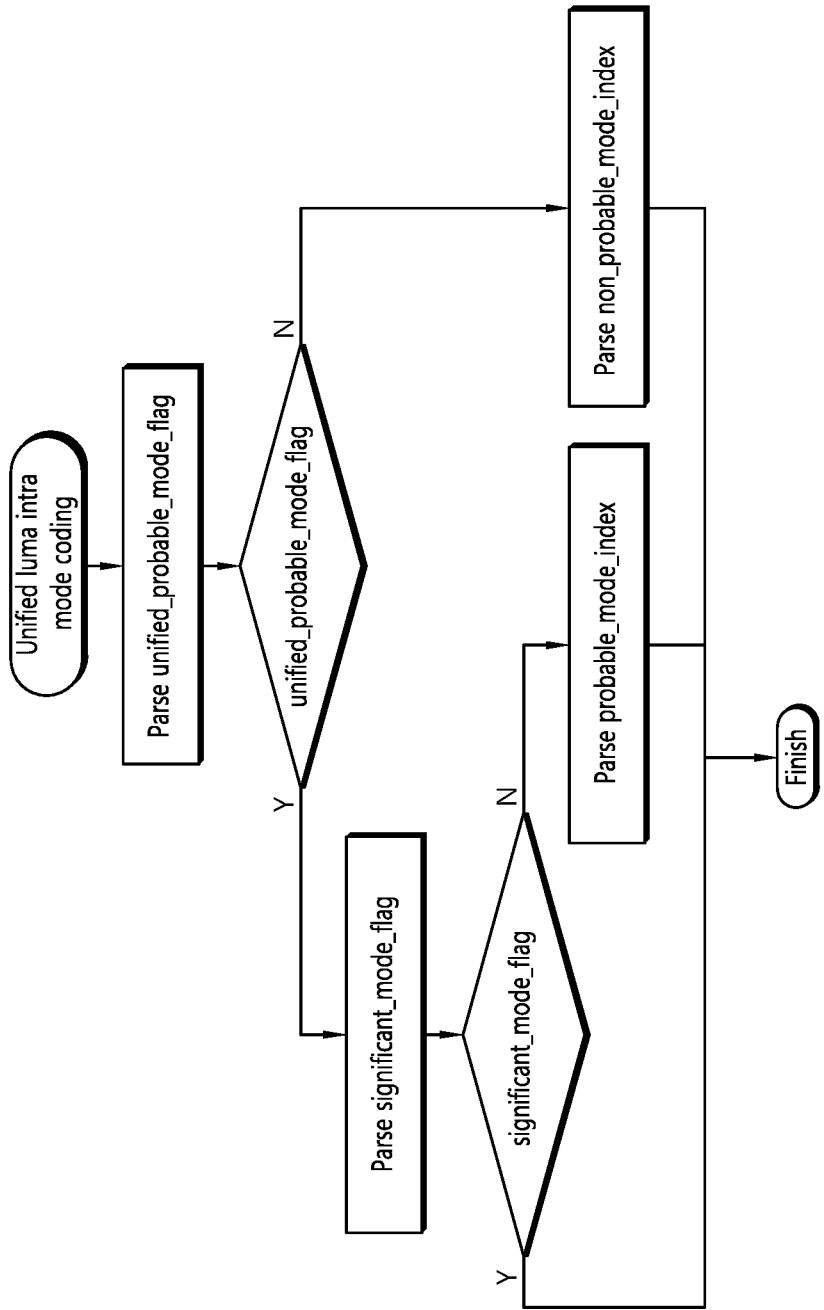
FIG. 10 is a flowchart showing an MPM prediction method according to another embodiment.

FIG. 10 is a flowchart showing an MPM prediction method according to another embodiment.

In FIG. 10, intra prediction performed based on one unified method (or algorithm) without depending on whether intra prediction based on MRL (Multi-Reference Line) is applied or prediction based on ISP (Intra Sub Partition) is applied is referred to as "unified luma intra mode coding". However, "unified luma intra mode coding" may be replaced by various terms such as unified luma intra mode, unified intra prediction, unified MPM, unified MPM prediction, unified_probable_mode, unified intra coding, unified luma intra coding, or the like.

A detailed method for deriving a unified luma intra mode according to an embodiment is as follows.

First, unified_probable_mode_flag may be parsed. If the value of unified_probable_mode_flag is 0, non_probable_mode_index may be parsed, and if it is 1, significant_mode_flag may be parsed. If the value of significant_mode_flag is 1, the intra prediction mode for the current block may be determined to be a signature mode (e.g., intra planar mode), while, if the value of significant_mode_flag is 0, probable_mode_index may be parsed.

Alternatively, a specific method for deriving a unified luma intra mode according to an embodiment may be shown in Table 5 below.

TABLE 5

Step 1. Parse unified_probable_mode_flag or unified_probable_mode_flag is previously assigned with certain value.
If unified_probable_mode_flag equals to 1, it specifies the unified probable intra mode is used for current intra coding unit (CU). And then step 1.1 is performed.

TABLE 5-continued

Otherwise, unified_probable_mode_flag equals to 0, it specifies that the unified probable intra mode is not used. Instead, non_probable_mode is used for current intra CU. And then step 1.2 is performed.
  Step 1.1 Parse significant_mode_flag.
  If significant_mode_flag equals to 1, it specifies that one significant intra mode is used for current intra coding unit (CU). And then step 1.1.1 is performed.
  Otherwise, significant_mode_flag equals to 0, it specifies that the significant intra mode is not used. Instead, one of the probable mode in the probable list is used for current intra CU. And then step 1.1.2 is performed
    Step 1.1.1 pre-defined one significant mode is assigned to predModeIntra indicates that the one specific significant mode is used for current intra CU.
    Step 1.1.2 Parse probable_mode_index.
    probable_mode_index is parsed to indicated that one of probable mode list is used for current intra CU. Detailed construction of probable mode list is described in following Table 6.
  Step 1.2 Parse non_probable_mode_idx
  non_probable_mode_idx parsed to indicated that one of the non probable mode list is used for current intra CU A method for constructing an MPM list according to an embodiment is proposed. An MPM mode list of k length may be constructed. In an example, k may be 5, and 5 conditions may be used when constructing 5 different MPM lists. Block B of FIG. 7 may be marked with an A, and block D may be marked with an L. For example, the MPM list construction method according to this embodiment may be as shown in Table 6 below.

TABLE 6

1. Check condition 1 whether L and A are the same. If condition 1 meets, then go to step 2.1, otherwise go to step 2.2.
L==A (condition 1)
2.
2.1 In this case, L and A are the same. Check condition 2 whether L is bigger than DC_idx which implies that L and A are both angular modes. If condition 2 meets, then go to step 5.1, otherwise go to step 5.2.
L> DC_idx (condition 2)
2.2 In this case, L and A are different. Check condition 3 whether L or A is bigger than DC_idx, implies that at least one of the L and A is angular mode. If condition 3 meets, then go to step 3
L>DC_idx or A>DC_idx (condition 3)
3. The following applies.
maxAB=max (L, A) which takes the bigger value between L and A.
minAB=min(L,A) which takes the smaller value between L and A
checks condition 4 whether both L and A are bigger than DC_idx which implies that both of L and A are angular modes. If condition 4 meets, then go to step 4.1, otherwise go to step 4.2.
L>DC_idx and A>DC_idx (condition 4)
4.
4.1 In this case, both L and A are angular modes. Check condition 5 whether the difference between L and A is equal or less than 62 and equal or larger than 2. If condition 5 meets, then go to step 5.3, otherwise go to step 5.4.
The variable diff=maxAB−minAB
diff <=62 AND diff >=2 (condition 5)
4.2 In this case, only one of L and A is angular modes. go to step 5.5
mpm[3] = Horizontal_idx
mpm[4] = Vertical_idx−4
mpm[5] = Vertical_idx+4
5.3 Construct list 3
mpm[0]=L
mpm[1]=A
mpm[2] = DC_idx
mpm[3] = maxAb−1
mpm[4] = maxAB+1
5.4 Construct list 4
mpm[0]=L
mpm[1]=A
mpm[2] = DC_idx
mpm[3] = maxAb−2
mpm[4] = maxAB+2
5.5 Construct list 5
mpm[0]= maxAB
mpm[1]= DC_idx
mpm[2] = maxAb−1

TABLE 6-continued mpm[3] = maxAB +1
mpm[4] = maxAb−2
In step 5, intra angular mode+1, intra angular mode−1 and intra angular mode−2 are not simple mathematically adding or subtracting values. In some cased, by subtracting and adding angular modes, one may become non-angular mode which break the consistency of neighbor intra mode or one may exceed the maximum available intra mode index. For instance, intra angular mode minus 1 would results intra mode 1 which is DC index. Plus one to intra angular mode 66 would results 67 which exceeds the maximum available intra mode 66. Hence, adding and subtracting bounded using modular arithmetic (denoted as %) as below.
   Intra mode −1 is
     (Intra mode +61)%64+2
   Intra mode +1 is
     (Intra mode −1)%64+2
   Intra mode −2 is
     (Intra mode +60)%64+2
   Intra mode +2 is
     (Intra mode)%64+2

Meanwhile, the embodiment is not limited to performing the unified luma intra coding only when the unified MPM flag whose value is 1 is signaled. For example, the decoding apparatus according to an embodiment may perform unified luma intra coding without signaling the unified MPM flag.

In an embodiment, unified intra prediction signaling and intra mode signaling may be combined with MPM list construction, and a non-MPM list may be constructed. This embodiment may be based on the coding unit syntax of Table 7 below.

TABLE 7

| | Desciptor |
|---|---|
| coding_unit( x0, y0, cbWidth, cbHeight, treeType ) { | |
| ... | |
| if( treeType = = SINGLE_TREE | | treeType = = DUAL_TREE_LUMA ) { | |
| if( ( y0 % CtbSizeY ) > 0 ) | |
| intra_luma_ref_idx[ x0 ][ y0 ] | ae(v) |
| if (intra_luma_ref_idx[ x0 ][ y0 ] = = 0 && ( cbWidth <= MaxTbSizeY | | cbHeight <= MaxTbSizeY ) && ( cbWidth * cbHeight > MinTbSizeY * MinTbSizeY )) | |
| intra_subpartitions_mode_flag[ x0 ][ y0 ] | ae(v) |
| if( intra_subpartitions_mode_flag[ x0 ][ y0 ] = = 1 && cbWidth <= MaxTbSizeY && cbHeight <= MaxTbSizeY ) | |
| intra_subpartitions_split_flag[ x0 ][ y0 ] | ae(v) |
| if( intra_luma_ref_idx[ x0 ][ y0 ] = = 0 && intra_subpartitions_mode_flag[ x0 ][ y0 ] = = 0 ) | |
| intra_luma_mpm_flag[ x0 ][ y0 ] | ae(v) |
| if( intra_luma_mpm_flag[ x0 ][ y0 ] ) | |
| intra_planar_flag[ x0 ][ y0 ] | ae(v) |
| if (intra_planar_flag==0) | |
| intra_luma_mpm_idx[ x0 ][ y0 ] | ae(v) |
| else | |
| intra_luma_mpm_remainder[ x0 ][ y0 ] | ae(v) |
| } | |
| ... | |

The coding unit syntax of Table 7 may be based on, for example, the semantics of Table 8 below.

TABLE 8 intra_luma_mpm_flag[ x0 ][ y0 ], intra_planar_flag[ x0 ][ y0 ], intra_luma_mpm_idx[ x0 ][ y0 ] and intra_luma_mpm_remainder[ x0 ][ y0 ] specify the intra prediction mode for luma samples. The array indices x0, y0 specify the location ( x0, y0 ) of the top-left luma sample of the considered coding block relative to the top-left luma sample of the picture. When intra_luma_mpm_flag[ x0 ][ y0 ] is equal to 1, the intra_planar_flag is parsed. When intra_planar_flag is equal to 1, it specifies that the the variable IntraPredModeY[ xCb ][ yCb ] is equal to INTRA_PLANAR. When intra_planar_flag is equal to 0, the intra prediction mode is inferred from a neighbouring intra-predicted coding unit according to clause 8.4.2. When intra_luma_mpm_flag[ x0 ][ y0 ] is not present, it is inferred to be equal to 1.

In an example, the decoding process of the coding unit coded in the intra prediction mode may be based on the algorithm (or spec) of Table 9 below.

TABLE 9

8.4.1 General decoding process for coding units coded in intra prediction mode

- If pcm_flag[ xCb ][ yCb ] is equal to 0, the following applies:
  1. If intra_planar_flag[ x0 ][ y0 ] equal to 1, IntraPredModeY[ xCb ][ yCb ] is equal to INTRA_PLANAR.
  2. Overwise, the derivation process for the luma intra prediction mode as specified in clause 8.4.2 is invoked with the luma location ( xCb, yCb ), the width of the current coding block in luma samples cb Width and the height of the current coding block in luma samples cbHeight as input. The output is IntraPredMode Y[ xCb ][ yCb ] specifying the luma intra prediciton mode.

With the derivation of IntraPredModeY[ xCb ][ yCb ] in the previous steps, the general decoding process for intra blocks as specified in clause 8.4.4.1 is invoked with the luma location ( xCb, yCb ), the tree type treeType, the variable nTbW set equal to cbWidth, the variable nTbH set equal to cbHeight, the variable predModeIntra set equal to IntraPredMode Y[ xCb ][ yCb ], and the variable cIdx set equal to 0 as inputs, and the output is a modified reconstructed picture before in-loop filtering.

<syntax elements and associated binarizations>

| Syntax structure | Syntax element | Binarization | |
|---|---|---|---|
| | | Process | Input parameters |
| coding_unit( ) | intra_planar_flag[ ][ ] | FL | cMax = 1 |

<Assignment of ctxInc to syntax elements with context coded bins>
Case I

| Syntax element | binIdx | | | | |
|---|---|---|---|---|---|
| | 0 | 1 | 2 | 3 | 4 | >=5 |
| intra_planar_flag[ ][ ] | 0 | na | na | na | na | na |

Case II

The assignment of ctxInc is specified as follows with condL and condA specified in for the syntax element intra_planar_flag[ x0 ][ y0 ]
ctxInc = (condL && availableL ) || (conA && availableA) or ctxInc = (condL && availableL ) && (conA && availableA)
- condL == PLANAR ? 1 : 0
- condA == PLANAR ? 1 : 0
- availableL specifying the availability of the block located directly to the left of the current block.
- availableA specifying the availability of the block located directly to the left of the current block.
-

| Syntax element | binIdx | | | | |
|---|---|---|---|---|---|
| | 0 | 1 | 2 | 3 | 4 | >=5 |
| intra_planar_flag[ ][ ] | 0, 1 | na | na | na | na | na |

Case III

The assignment of ctxInc is specified as follows with condL and condA specified in for the syntax element intra_planar_flag[ x0 ][ y0 ]
ctxInc = (condL && availableL ) + (conA && availableA)
- condL == PLANAR ? 1 : 0
- condA == PLANAR ? 1 : 0
- availableL specifying the availability of the block located directly to the left of the current block.
- availableA specifying the availability of the block located directly to the left of the current block.

| Syntax element | binIdx | | | | |
|---|---|---|---|---|---|
| | 0 | 1 | 2 | 3 | 4 | >= 5 |
| intra_planar_flag[ ][ ] | 0, 1, 2 | na | na | na | na | na |

The above embodiment (case I, case II, and case III) is just only one practical example, the number of context models can be arbitrariliy determined.

In an example, the process of deriving the luma intra prediction mode may be based on the algorithm (or spec) of Table 10 below.

TABLE 10

| 8.4.2 Derivation process for luma intra prediction mode |
| --- |
| Derivation process for luma intra prediction mode |
| Input to this process are: |
| a luma location ( xCb , yCb ) specifying the top-left sample of the current luma coding block relative to the top-left luma sample of the current picture, a variable cbWidth specifying the width of the current coding block in luma samples, a variable cbHeight specifying the height of the current coding block in luma samples. In this process, the luma intra prediction mode IntraPredMode Y[ xCb ][ yCb ] is derived. |

Table 8-1 specifies the value for the intra prediction mode IntraPredModeY[ xCb ][ yCb ] and the associated names.
Table 8-1-Specification of intra prediction mode and associated names

| Intra prediction mode | Associated name |
| --- | --- |
| 0 | INTRA_PLANAR |
| 1 | INTRA_DC |
| 2 . . . 66 | INTRA_ANGULAR2 . . . INTRA_ANGULAR66 |
| 81 . . . 83 | INTRA_LT_CCLM, INTRA_L_CCLM, INTRA_T_CCLM |

IntraPredMode Y[ xCb ][ yCb ] is derived by the following ordered steps:
1. The neighbouring locations ( xNbA, yNbA ) and (xNbB, yNbB ) are set equal to ( xCb − 1, yCb + cbHeight − 1 ) and ( xCb + cbWidth − 1, yCb − 1 ), respectively.
2. For X being replaced by either A or B, the variables candIntraPredModeX are derived as follows:
   The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xNbX, yNbX ) as inputs, and the output is assigned to availableX.
   The candidate intra prediction mode candIntraPredModeX is derived as follows:
   If one or more of the following conditions are true, candIntraPredModeX is set equal to INTRA_PLANAR.
      The variable availableX is equal to FALSE.
      CuPredMode[ xNbX ][ yNbX ] is not equal to MODE_INTRA
      pcm_flag[ xNbX ][ yNbX ] is equal to 1.
      X is equal to B and yCb − 1 is less than ( ( yCb >> CtbLog2SizeY ) << CtbLog2SizeY ).
   Otherwise, candIntraPredModeX is set equal to IntraPredModeY[ xNbX ][ yNbX ].
3. The candModeList[ x ] with x = 0..4 is derived as follows:
   If candIntraPredModeB is equal to candIntraPredModeA and candIntraPredModeA is greater than INTRA_DC, candModeList[ x ] with x = 0..4 is derived as follows:
      candModeList[ 0 ] = candIntraPredModeA                                        (8-10)
      candModeList[ 1 ] = 2 + ( ( candIntraPredModeA + 61 ) % 64 )                  (8-12)
      candModeList[ 2 ] = 2 + ( ( candIntraPredModeA − 1 ) % 64 )                   (8-13)
      candModeList[ 3 ] = INTRA_DC                                                  (8-11)
      candModeList[ 4 ] = 2 + ( ( candIntraPredModeA + 60 ) % 64 )                  (8-14)
   Otherwise if candIntraPredModeB is not equal to candIntraPredModeA and candIntraPredModeA or candIntraPredModeB is greater than INTRA_DC, the following applies:
      The variables minAB and maxAB are derived as follows:
         minAB = Min( candIntraPredModeA, candIntraPredModeB )                      (8-24)
         maxAB = Max( candIntraPredModeA, candIntraPredModeB )                      (8-25)
      If candIntraPredModeA and candIntraPredModeB are both greater than INTRA_DC, candModeList[ x ] with x = 0..4 is derived as follows:
         candModeList[ 0 ] = candIntraPredModeA                                     (8-27)
         candModeList[ 1 ] = candIntraPredModeB
         candModeList[ 2 ] = INTRA_DC                                               (8-29)
         If maxAB − minAB is in the range of 2 to 62, inclusive, the following applies:
            candModeList[ 3 ] = 2 + ( ( maxAB + 61 ) % 64 )                         (8-30)
            candModeList[ 4 ] = 2 + ( ( maxAB − 1 ) % 64 )                          (8-31)
         Otherwise, the following applies:
            candModeList[ 3 ] = 2 + ( ( maxAB + 60 ) % 64 )                         (8-32)
            candModeList[ 4 ] = 2 + ( ( maxAB ) % 64 )                              (8-33)
      Otherwise (candIntraPredModeA or candIntraPredModeB is greater than INTRA_DC), candModeList[ x ] with x = 0..4 is derived as follows:
         candModeList[ 0 ] = maxAB                                                  (8-65)
         candModeList[ 1 ] = INTRA_DC                                               (8-66)
         candModeList[ 2 ] = 2 + ( ( maxAB + 61 ) % 64 )                            (8-66)
         candModeList[ 3 ] = 2 + ( ( maxAB − 1 ) % 64 )                             (8-67)
         candModeList[ 4 ] = 2 + ( ( maxAB + 60 ) % 64 )                            (8-68)

TABLE 10-continued

| 8.4.2 Derivation process for luma intra prediction mode |
|---|

Otherwise, the following applies:
    candModeList[ 0 ] = INTRA_DC  (8-71)
    candModeList[ 1 ] = INTRA_ANGULAR50                                                 (8-72)
    candModeList[ 2 ] = INTRA_ANGULAR18                                                 (8-73)
    candModeList[ 3 ] = INTRA_ANGULAR46
    candModeList[ 4 ] = INTRA_ANGULAR54                                                 (8-75)
                                        (8-81)
4.  IntraPredModeY[ xCb ][ yCb ] is derived by applying the following procedure:
    If intra_luma_mpm_flag[ xCb ][ yCb ] is equal to 1, the IntraPredModeY[ xCb ][ yCb ] is set
    equal to candModeList[ intra_luma_mpm_idx[ xCb ][ yCb ] ].
    Otherwise, IntraPredModeY[ xCb ][ yCb ] is derived by applying the following ordered steps:
       1. When candModeList[ i ] is greater than candModeList[ j ] for i = 0..4 and for each i,
          j = ( i + 1 )..5, both values are swapped as follows:
            ( candModeList[ i ], candModeList[ j ] ) = Swap( candModeList[ i ],                   (8-94)
            candModeList[ j ] )
       2. IntraPredMode Y[ xCb ][ yCb ] is derived by the following ordered steps:
         i. IntraPredMode Y[ xCb ][ yCb ]   is   set   equal   to
            intra_luma_mpm_remainder[ xCb ][ yCb ].
         ii. For i equal to 0 to 5, inclusive, when IntraPredModeY[ xCb ][ yCb ] is greater than or
            equal to candModeList[ i ],  the  value  of  IntraPredModeY[ xCb ][ yCb ]  is
            incremented by one.
The variable IntraPredModeY[ x ][ y ] with   x = xCb..xCb + cbWidth − 1 and y = yCb..yCb + cbHeight − 1
is set to be equal to IntraPredModeY[ xCb ][ yCb ].

NOTE
The intra prediction modes INTRA_LT_CCLM, INTRA_L_CCLM and INTRA_T_CCLM are only applicable to chroma components.

In an example, the decoding process of intra blocks may be based on the algorithm (or spec) of Table 11 below.

TABLE 11

8.4.4.1 General decoding process for intra blocks... For xPartIdx = 0..numPartsX 1 and yPartIdx = 0..numPartsY −1, the following applies:The general intra sample prediction process as specified in clause 8.4.4.2.1 is invoked with the location ( xThCmp, yTbCmp ) set equal to
( xTb0 + nW * xPartIdx, yTb0 + nH * yPartIdx ), the intra prediction mode predModeIntra, the transform block width nTbW and height nTbH set equal to nW and nH, the coding block width nCbW and height nCbH set equal to nTbW and mTbH, and the variable cIdx as inputs, and the output is an (nTbW)x(nTbH) array predSamples.

In an example, intra-sample prediction may be based on the algorithm (or spec) of Table 12 below.

TABLE 12

8.4.4.2.1 General intra sample prediction

The intra sample prediction process according to predModeIntra applies as follows:
  If predModeIntra is equal to INTRA_PLANAR, the corresponding intra prediction mode process specified in clause 8.4.4.2.5 is invoked with the transform block width nTbW, and the transform block height nTbH, the intra prediction reference line index refIdx, and the reference sample array p as inputs, and the output is the predicted sample array predSamples.
  Otherwise, if predModeIntra is equal to INTRA_DC, the corresponding intra prediction mode process specified in clause 8.4.4.2.6 is invoked with the transform block width nTbW, the transform block height nTbH, the intra prediction reference line index refIdx, and the reference sample array p as inputs, and the output is the predicted sample array predSamples.
  Otherwise, if predModeIntra is equal to INTRA_LT_CCLM, INTRA_L_CCLM or INTRA_T_CCLM, the corresponding intra prediction mode process specified in clause 8.4.4.2.8 is invoked with the intra prediction mode predModeIntra, the sample location ( xTbC, yTbC ) set equal to ( xTbCmp, yTbCmp ), the transform block width nTbW and height nTbH, and the reference sample array p as inputs, and the output is the predicted sample array predSamples.
  Otherwise, the corresponding intra prediction mode process specified in clause 8.4.4.2.7 is invoked with the intra prediction mode predModeIntra, the intra prediction reference line index refIdx, the transform block width nTbW, the transform block height nTbH, the reference sample width refW, the reference sample height refH, the coding block width nCbW and height nCbH, the colour component index cIdx, and the reference sample array p as inputs, and the modified intra prediction mode predModeIntra and the predicted sample array predSamples as outputs.

In an example, the intra planar mode, the intra DC mode, and the like may be based on the algorithm (or spec) of Table 13 below.

TABLE 13

8.4.4.2.5 Specification of INTRA_PLANAR intra prediction mode

Specification of INTRA PLANAR intra prediction mode
Inputs to this process are:
 a variable nTbW specifying the transform block width,
 a variable nTbH specifying the transform block height,
 a variable refIdx specifying the intra prediction reference line index,
 the neighbouring samples p[ x ][ y ], with x = −1−refIdx, y = −1−refIdx..nTbH and
 x = −refIdx..nTbW, y = −1−refIdx.
Outputs of this process are the predicted samples predSamples[ x ][ y ], with x = 0..nTbW − 1, y = 0..nTbH − 1.
The variables nW and nH are derived as follows:
  nW = Max( nTbW, 2 ) (8-116)
  nH = Max( nTbH, 2 ) (8-117)
  The values of the prediction samples predSamples[ x ][ y ], with x = 0..nTbW − 1 and y = 0..nTbH − 1,
  are derived as follows:predV[ x ][ y ] = ( ( nH − 1 − y ) * p[ x ][ −1 −refIdx] + ( y + 1 ) * p[ −1−
  refIdx][ nTbH ] ) << Log2 ( nW ) (8-118)
  predH[ x ][ y ] = ( ( nW − 1 − x ) * p[ −1− refIdx ][ y ] + ( x + 1 ) * p[ nTbW ][ −1−
  refIdx ] ) << Log2 ( nH ) (8-119)
  predSamples[ x ][ y ] = ( predV[ x ][ y ] + predH[ x ][ y ] + nW * nH ) >> (Log2 ( nW ) + Log2 ( nH )
  + 1 ) (8-120)

8.4.4.2.6 Specification of INTRA_DC intra prediction mode

Inputs to this process are:
 a variable nTbW specifying the transform block width,
 a variable nTbH specifying the transform block height,
 a variable refIdx specifying the intra prediction reference line index,
 the neighbouring samples p[ x ][ y ], with x = −1−refIdx, y = −1−refIdx..nTbH − 1 and
 x = −refIdx..nTbW − 1 , y = −1−refIdx.
Outputs of this process are the predicted samples predSamples[ x ][ y ], with x = 0..nTbW − 1,
y = 0..nTbH − 1.
The values of the prediction samples predSamples[ x ][ y ], with x = 0..nTbW − 1, y = 0..nTbH − 1, are derived
by the following ordered steps:
1. A variable dcVal is derived as follows:
   When nTbW is equal to nTbH:
     dcVal = ($\Sigma_{x'=0}^{nTbW-1}$ p[x'][−1 − refIdx] + $\Sigma_{y'=0}^{nTbH-1}$ p[−1 − refIdx][y'] + nTbW) >>
     (Log2(nTbW) + 1)
     (8-121)
   When nTbW is greater than nTbH:
     dcVal = ($\Sigma_{x'=0}^{nTbW-1}$ p[x'][−1 − refIdx] + (nTbW >> 1) ) >> Log2(nTbW) (8-122)
   When nTbW is less than nTbH:
     dcVal = ($\Sigma_{y'=0}^{nTbH-1}$ p[−1 − refIdx][y'] + (nTbW >> 1) ) >> Log2(nTbH) (8-123)
2. The prediction samples predSamples[ x ][ y ] are derived as follows:
predSamples[ x ][ y ] = dcVal, with x = 0.. nTbW − 1, y = 0.. nTbH − 1 (8-124)

In an example, the transformation process of the scaled 40 transform coefficients may be based on the algorithm (or spec) of Table 14 below.

TABLE 14

8.7.4.1 Transformation process for scaled transform coefficients

Table 8-15-Specification of trTypeHor and trTypeVer depending on predModeIntra

| predModeIntra | trTypeHor | trTypeVer |
|---|---|---|
| INTRA_PLANAR, INTRA_ANGULAR31, INTRA_ANGULAR32, INTRA_ANGULAR34, INTRA_ANGULAR36, INTRA_ANGULAR37 | ( nTbW >= 4 && nTbW <= 16 ) ? 1:0 | ( nTbH >= 4 && nTbH <= 16 ) ? 1:0 |
| INTRA_DC, INTRA_ANGULAR33, INTRA_ANGULAR35 | 0 | 0 |
| INTRA_ANGULAR2, INTRA_ANGULAR4, . . . ,INTRA_ANGULAR28, INTRA_ANGULAR30, INTRA_ANGULAR39, INTRA_ANGULAR41, . . . ,INTRA_ANGULAR63, INTRA_ANGULAR65 | ( nTbW >= 4 && nTbW <= 16 ) ? 1:0 | 0 |

TABLE 14-continued 8.7.4.1 Transformation process for scaled transform coefficients

| | | |
|---|---|---|
| INTRA_ANGULAR3, INTRA_ANGULAR5, . . . , INTRA_ANGULAR27, INTRA_ANGULAR29, INTRA_ANGULAR38, INTRA_ANGULAR40, . . . ,INTRA_ANGULAR64, INTRA_ANGULAR66 | 0 | ( nTbH >= 4 && nTbH <= 16 ) ? 1:0 |

Table 9.9-Syntax elements and associated binarizations

| | | Binarization | |
|---|---|---|---|
| Syntax structure | Syntax element | Process | Input parameters |
| coding_unit( ) | cu_skip_flag[ ][ ] | FL | cMax = 1 |
| | pred_mode_ibc_flag | FL | cMax = 1 |
| | pred_mode_flag | FL | cMax = 1 |
| | pcm_flag[ ][ ] | FL | cMax = 1 |
| | intra_luma_ref_idx[ ][ ] | TR | cMax = 2, cRiceParam = 0 |
| | intra_subpartitions_mode_flag | FL | cMax = 1 |
| | intra_subpartition_split_flag | FL | cMax = 1 |
| | intra_luma_mpm_flag[ ][ ] | FL | cMax = 1 |
| | intra_planar_flag[ ][ ] | FL | cMax = 1 |
| | intra_luma_mpm_idx[ ][ ] | TR | cMax = 4, cRiceParam = 0 |
| | intra_luma_mpm_remainder[ ][ ] | TB | cMax = 60 |
| | intra_chroma_pred_mode [ ][ ] | 9.5.3.8 | — |
| | merge_flag[ ][ ] | FL | cMax = 1 |
| | inter_pred_idc[ x0 ][ y0 ] | 9.5.3.9 | cbWidth, cbHeight |

Table 9-5-Association of ctxIdxOffset and syntax elements for each initializationType in the initialization process

| | | | initType | | |
|---|---|---|---|---|---|
| Syntax structure | Syntax element | ctxTable | 0 | 1 | 2 |
| coding_unit( ) | cu_skip_flag[ ][ ] | | | 0 | 3 |
| | pred_mode_ibc_flag | | | | |
| | pred_mode_flag | | | | |
| | intra_luma_ref_idx[ ][ ] | | | | |
| | intra_subpartitions_mode_flag | | | | |
| | intra_subpartition_split_flag | | | | |
| | intra_luma_mpm_flag[ ][ ] | | | | |
| | intra_planar_flag[ ][ ] | | | | |

In an example, an example of allocating ctxInc to syntax elements including context coded bins may be based on Table 15 below.

TABLE 15

| | binIdx | | | | | |
|---|---|---|---|---|---|---|
| Syntax element | 0 | 1 | 2 | 3 | 4 | >=5 |
| intra_luma_ref_idx[ ] [ ] | 0 | 1 | na | na | na | na |
| intra_subpartitions_mode_flag | 0 | na | na | na | na | na |
| intra_subpartitions_split_flag | 0 | na | na | na | na | na |
| intra_luma_mpm_flag[ ] [ ] | 0 | na | na | na | na | na |
| intra_planar_flag[ ][ ] | intra_luma_ref_idx!=0? 2:(intra_subpartitions_ mode_flag? 0: 1) | na | na | na | na | na |
| intra_luma_mpm_idx [ ][ ] | bypass | bypass | bypass | bypass | bypass | na |
| intra_luma_mpm_remainder[ ][ ] | bypass | bypass | bypass | bypass | bypass | bypass |
| intra_chroma_pred_mode[ ][ ] sps_cclm_enabled_flag = = 0 | 0 | bypass | bypass | na | na | na |

An embodiment proposes a method of performing unified MPM prediction and a method of coding and/or signaling information on a related intra prediction mode. In addition, an embodiment proposes a method of deriving a transform kernel. According to an embodiment, the coding unit syntax written in Tables 16 to 24 may be constructed/encoded and signaled to the decoding apparatus, and the decoding apparatus may derive an intra prediction mode for the current block (CU) based on the coding unit syntax and the MPM list.

For example, according to this embodiment, the planar mode may be included as a candidate mode in the MPM list, and if the value of the MPM flag is 1, a planar flag (intra_planar_flag) may be signaled first and indicate whether or not the planar mode is used as the intra prediction mode of the current block. If the value of the planar flag is 0, the MPM index (intra_luma_mpm_idx) is signaled, and through this, one of the remaining MPM candidates except for the planar mode may be indicated. In this case, in an example, the MPM list including the remaining candidates except for the planar mode may be referred to as a modified MPM list.

If the total number of MPM candidates including the planar mode is 6, the total number of candidates in the modified MPM list from which the planar mode has been excluded may be 5, and in this case, the value of the MPM index may be between 0 and 4. In other words, the maximum value of the MPM index may be set to 4. In this case, the maximum value of the MPM index may be expressed as cMAX of the MPM index. The bin of the planar flag may be regular coded based on a context model as will be described later in Tables 16 to 24, and the value of ctxInc for indicating the context model may be variably determined, as will be described later in Tables 16 to 24, according to i) only one specific value (e.g., 0) is used, or ii) it can be variably derived based on the availability of the left neighboring block and/or the top neighboring block and the value of the planar flag (if available), or iii) whether MRL or ISP is applied. Also, according to this embodiment, a transform kernel (vertical transform kernel/horizontal transform kernel) for the current block may be derived based on the size of the current block and/or the intra prediction type/mode. For example, if the ISP is not applied to the current block or is not available, as will be described later in Tables 16 to 24 below, a transform kernel (vertical transform kernel/horizontal transform kernel) may be derived as a value of 1 or 0 by further referring to the size of the current block.

According to this embodiment, when MRL intra prediction is applied (that is, when the MRL index is greater than 0), the planar mode or the DC mode may be applied to the current block, and even when ISP intra prediction is applied, the planar mode or the DC mode may be applied to the current block. Therefore, it is possible to construct the MPM list based on the unified MPM prediction without depending on whether MRL, ISP, or the like is applied. Tables 16 to 24 are as follows, and the details of Tables 16 to 24 will be easily understood by those skilled in the art.

Table 16 below shows an example of coding unit syntax.

TABLE 16

| | Descriptor |
|---|---|
| coding_unit( x0, y0, cbWidth, cbHeight, treeType ) { | |
| ... | |
| if( treeType = = SINGLE_TREE | | treeType = = DUAL_TREE_LUMA ) { | |
| if( ( y0 % CtbSizeY ) > 0 ) | |
| intra_luma_ref_idx[ x0 ][ y0 ] | ae(v) |
| if (intra_luma_ref_idx[ x0 ][ y0 ] = = 0 && ( cbWidth <= MaxTbSizeY | | cbHeight <= MaxTbSizeY ) && ( cbWidth * cbHeight > MinTbSizeY * MinTbSizeY )) | |
| intra_subpartitions_mode_flag[ x0 ][ y0 ] | ae(v) |
| if( intra_subpartitions_mode_flag[ x0 ][ y0 ] = = 1 && cbWidth <= MaxTbSizeY && cbHeight <= MaxTbSizeY ) | |
| intra_subpartitions_split_flag[ x0 ][ y0 ] | ae(v) |
| if( intra_luma_ref_idx[ x0 ][ y0 ] = = 0 && intra_subpartitions_mode_flag[ x0 ][ y0 ] = = 0 ) | |
| inta_luma_mpm_flag[ x0 ][ y0 ] | ae(v) |
| if( intra_luma_mpm_flag[ x0 ][ y0 ] ) | |
| intra_planar_flag[ x0 ][ y0 ] | ae(v) |
| if (intra_planar_flag==0) | |
| intra_luma_mpm_idx[ x0 ][ y0 ] | ae(v) |
| else | |
| intra_luma_mpm_remainder[ x0 ][ y0 ] | ae(v) |
| } | |
| ... | |
| } | |

The coding unit syntax of Table 16 may be based on, for example, the semantics of Table 17 below.

TABLE 17 intra_luma_mpm_flag[ x0 ][ y0 ], intra_planar_flag[ x0 ][ y0 ], intra_luma_mpm_idx[ x0 ][ y0 ] and intra_luma_mpm_remainder[ x0 ][ y0 ]

specify the intra prediction mode for luma samples. The array indices x0, y0 specify the location ( x0 , y0 ) of the top-left luma sample of the considered coding block relative to the top-left luma sample of the picture. When intra_luma_mpm_flag[ x0 ][ y0 ] is equal to 1, the intra_planar_flag is parsed.

When intra_planar_flag is equal to 1, it specifies that the the variable

IntraPredModeY[ xCb ][ yCb ] is equal to INTRA_PLANAR. When intra_planar_flag is equal to 0, the intra prediction mode is inferred from a neighbouring intra-predicted coding unit according to clause 8.4.2.When intra_luma_mpm_flag[ x0 ][ y0 ] is not present, it is inferred to be equal to 1.

In an example, the decoding process of the coding unit coded in the intra prediction mode may be based on the algorithm (or spec) of Table 18 below.

TABLE 18

8.4.1 General decoding process for coding units coded in intra prediction mode

- If pcm_flag[ xCb ][ yCb ] is equal to 0, the following applies:
1. If intra_planar_flag[ x0 ][ y0 ] equal to 1, IntraPredModeY[ xCb ][ yCb ] is equal to INTRA PLANAR.
2. Overwise, the derivation process for the luma intra prediction mode as specified in clause 8.4.2 is invoked with the luma location ( xCb, yCb ), the width of the current coding block in luma samples cb Width and the height of the current coding block in luma samples cbHeight as input. The output is IntraPredMode Y[ xCb ][ yCb ] specifying the luma intra prediciton mode.
With the derivation of IntraPredMode Y[ xCb ][ yCb ] in the previous steps, the general decoding process for intra blocks as specified in clause 8.4.4.1 is invoked with the luma location ( xCb, yCb ), the tree type treeType, the variable nTbW set equal to cb Width, the variable nTbH set equal to cbHeight, the variable predModeIntra set equal to IntraPredModeY[ xCb ][ yCb ], and the variable cIdx set equal to 0 as inputs, and the output is a modified reconstructed picture before in-loop filtering.

<syntax elements and associated binarizations>

| Syntax structure | Syntax element | Binarization | |
|---|---|---|---|
| | | Process | Input parameters |
| coding_unit( ) | intra_planar_flag[ ][ ] | FL | cMax = 1 |

<Assignment of ctxInc to syntax elements with context coded bins>

Case I

| Syntax element | binIdx | | | | | |
|---|---|---|---|---|---|---|
| | 0 | 1 | 2 | 3 | 4 | >= 5 |
| intra_planar_flag[ ][ ] | 0 | na | na | na | na | na |

Case II

The assignment of ctxInc is specified as follows with condL and condA specified in for the syntax element intra_planar_flag[ x0 ][ y0 ]
ctxInc = (condL && availableL ) || (conA && availableA) or ctxInc = (condL && availableL ) && (conA && availableA)
- condL == PLANAR ? 1 : 0
- condA == PLANAR ? 1 : 0
- availableL specifying the availability of the block located directly to the left of the current block.
-
availableA specifying the availability of the block located directly to the left of the current block.
-

| Syntax element | binIdx | | | | | |
|---|---|---|---|---|---|---|
| | 0 | 1 | 2 | 3 | 4 | >= 5 |
| intra_planar_flag[ ][ ] | 0, 1 | na | na | na | na | na |

Case III

The assignment of ctxInc is specified as follows with condL and condA specified in for the syntax element intra_planar_flag[ x0 ][ y0 ]
ctxInc = (condL && availableL ) + (conA && availableA)
- condL == PLANAR ? 1 : 0
- condA = = PLANAR ? 1 : 0
- available specifying the availability of the block located directly to the left of the current block.
availableA specifying the availability of the block located directly to the left of the current block.

| Syntax element | binIdx | | | | | |
|---|---|---|---|---|---|---|
| | 0 | 1 | 2 | 3 | 4 | >= 5 |
| intra_planar_flag[ ][ ] | 0, 1, 2 | na | na | na | na | na |

The above embodiment (case I, case II, and case III) is just only one practical example, the number of context models can be arbitrariliy determined.

In an example, the process of deriving the luma intra prediction mode may be based on the algorithm (or spec) of Table 19 below.

TABLE 19

8.4.2 Derivation process for luma intra prediction mode

Derivation process for luma intra prediction mode
Input to this process are:
    a luma location ( xCb , yCb ) specifying the top-left sample of the current luma coding block relative to the top-left luma sample of the current picture,
    a variable cbWidth specifying the width of the current coding block in luma samples,
    a variable cbHeight specifying the height of the current coding block in luma samples.
In this process, the luma intra prediction mode IntraPredModeY[ xCb ][ yCb ] is derived.
Table 8-1 specifies the value for the intra prediction mode IntraPredMode Y[ xCb ][ yCb ] and the associated names.

Table 8-1-Specification of intra prediction mode and associated names

| Intra prediction mode | Associated name |
| --- | --- |
| 0 | INTRA_PLANAR |
| 1 | INTRA_DC |
| 2 . . . 66 | INTRA_ANGULAR2 . . . INTRA_ANGULAR66 |
| 81 . . . 83 | INTRA_LT_CCLM, INTRA_L_CCLM, INTRA_T_CCLM |

IntraPredMode Y[ xCb ][ yCb ] is derived by the following ordered steps:
1. The neighbouring locations ( xNbA, yNbA ) and ( xNbB, yNbB ) are set equal to
   ( xCb − 1, yCb + cbHeight − 1 ) and ( xCb + cbWidth − 1, yCb −1 ), respectively.
2. For X being replaced by either A or B, the variables candIntraPredModeX are derived as follows:
   The availability derivation process for a block as specified in clause 6.4.X [Ed. (BB):
   Neighbouring blocks availability checking process tbd] is invoked with the location
   ( xCurr, yCurr ) set equal to ( xCb, yCb ) and the neighbouring location ( xNbY, yNbY ) set equal
   to ( xNbX, yNbX ) as inputs, and the output is assigned to availableX.
   The candidate intra prediction mode candIntraPredModeX is derived as follows:
      If one or more of the following conditions are true, candIntraPredModeX is set equal to
         INTRA_PLANAR.
         The variable availableX is equal to FALSE.
         CuPredMode[ xNbX ][ yNbX ] is not equal to MODE_INTRA
         pcm_flag[ xNbX ][ yNbX ] is equal to 1.
         X is equal to B and yCb − 1 is less than ( ( yCb >> CtbLog2SizeY ) << CtbLog2SizeY ).
      Otherwise, candIntraPredModeX is set equal to IntraPredMode Y[ xNbX ][ yNbX ].
3. The candModeList[ x ] with x = 0..4 is derived as follows:
   If candIntraPredModeB is equal to candIntraPredModeA and candIntraPredModeA is greater than
      INTRA_DC, candModeList[ x ] with x = 0..4 is derived as follows:

|  |  |
| --- | --- |
| candModeList[ 0 ] = candIntraPredModeA | (8-10) |
| candModeList[ 1 ] = 2 + ( ( candIntraPredModeA + 61 ) % 64 ) | (8-12) |
| candModeList[ 2 ] = 2 + ( ( candIntraPredModeA − 1 ) % 64 ) | (8-13) |
| candModeList[ 3 ] = INTRA_DC | (8-11) |
| candModeList[ 4 ] = 2 + ( ( candIntraPredModeA + 60 ) % 64 ) | (8-14) |

Otherwise if candIntraPredModeB is not equal to candIntraPredModeA and candIntraPredModeA or
      candIntraPredModeB is greater than INTRA_DC, the following applies:
      The variables minAB and maxAB are derived as follows:

|  |  |
| --- | --- |
| minAB = Min( candIntraPredModeA, candIntraPredModeB ) | (8-24) |
| maxAB = Max( candIntraPredModeA, candIntraPredModeB ) | (8-25) |

If candIntraPredModeA and candIntraPredModeB are both greater than INTRA_DC,
         candModeList[ x ] with x = 0..4 is derived as follows:

|  |  |
| --- | --- |
| candModeList[ 0 ] = candIntraPredModeA | (8-27) |
| candModeList[ 1 ] = candIntraPredModeB | |
| candModeList[ 2 ] = INTRA_DC | (8-29) |

If maxAB − minAB is in the range of 2 to 62, inclusive, the following applies:

|  |  |
| --- | --- |
| candModeList[ 3 ] = 2 + ( ( maxAB + 61 ) % 64 ) | (8-30) |
| candModeList[ 4 ] = 2 + ( ( maxAB − 1 ) % 64 ) | (8-31) |

Otherwise, the following applies:

|  |  |
| --- | --- |
| candModeList[ 3 ] = 2 + ( ( maxAB + 60 ) % 64 ) | (8-32) |
| candModeList[ 4 ] = 2 + ( ( maxAB ) % 64 ) | (8-33) |

Otherwise (candIntraPredModeA or candIntraPredModeB is greater than INTRA_DC),
         candModeList[ x ] with x = 0..4 is derived as follows:

|  |  |
| --- | --- |
| candModeList[ 0 ] = maxAB | (8-65) |
| candModeList[ 1 ] = INTRA_DC | (8-66) |
| candModeList[ 2 ] = 2 + ( ( maxAB + 61 ) % 64 ) | (8-66) |
| candModeList[ 3 ] = 2 + ( ( maxAB − 1 ) % 64 ) | (8-67) |
| candModeList[ 4 ] = 2 + ( ( maxAB + 60 ) % 64 ) | (8-68) |

Otherwise, the following applies:

|  |  |
| --- | --- |
| candModeList[ 0 ] = INTRA_DC | (8-71) |
| candModeList[ 1 ] = INTRA_ANGULAR50 | (8-72) |

TABLE 19-continued 8.4.2 Derivation process for luma intra prediction mode

| | |
|---|---|
| candModeList[ 2 ] = INTRA_ANGULAR18 | (8-73) |
| candModeList[ 3 ] = INTRA_ANGULAR46 | (8-74) |
| candModeList[ 4 ] = INTRA_ANGULAR54 | (8-75) |
| (8-81) | |

4. IntraPredMode Y[ xCb ][ yCb ] is derived by applying the following procedure:
    If intra_luma_mpm_flag[ xCb ][ yCb ] is equal to 1, the IntraPredMode Y[ xCb ][ yCb ] is set
    equal to candModeList[ intra_luma_mpm_idx[ xCb ][ yCb ] ].
    Otherwise, IntraPredMode Y[ xCb ][ yCb ] is derived by applying the following ordered steps:
    1. When candModeList[ i ] is greater than candModeList[ j ] for i = 0..4 and for each i,
       j = ( i + 1 )..5, both values are swapped as follows:

| | |
|---|---|
| ( candModeList[ i ], candModeList[ j ] ) = Swap( candModeList[ i ], | (8-94) |
| candModeList[ j ] ) | |

2. IntraPredMode Y[ xCb ][ yCb ] is derived by the following ordered steps:
      i. IntraPredMode Y[ xCb ][ yCb ] is set equal to
        intra_luma_mpm_remainder[ xCb ][ yCb ].
      ii. For i equal to 0 to 5, inclusive, when IntraPredMode Y[ xCb ][ yCb ] is greater than or
        equal to candModeList[ i ], the value of IntraPredModeY[ xCb ][ yCb ] is
        incremented by one.
The variable IntraPredMode Y[ x ][ y ] with x = xCb..xCb + cbWidth − 1 and y = yCb..yCb + cbHeight − 1
is set to be equal to IntraPredMode Y[ xCb ][ yCb ].

NOTE
The intra prediction modes INTRA_LT_CCLM, INTRA_L_CCLM and INTRA_T_CCLM are only applicable to chroma components.

In an example, the decoding process of intra blocks may be based on the algorithm (or spec) of Table 20 below.

TABLE 20

8.4.4.1 General decoding process for intra blocks... For xPartIdx = 0..numPartsX 1 and yPartIdx = 0..numPartsY −1, the following applies:The general intra sample prediction process as specified in clause 8.4.4.2.1 is invoked with the location ( xTbCmp, yTbCmp ) set equal to ( xTb0 + nW * xPartIdx, yTb0 + nH * yPartIdx ), the intra prediction mode predModeIntra, the transform block width nTbW and height nTbH set equal to nW and nH, the coding block width nCbW and height nCbH set equal to nTbW and nTbH, and the variable cIdx as inputs, and the output is an (nTbW)x(nTbH) array predSamples.

In an example, intra-sample prediction may be based on the algorithm (or spec) of Table 21 below.

TABLE 21

8.4.4.2.1 General intra sample prediction

The intra sample prediction process according to predModeIntra applies as follows:
    If predModeIntra is equal to INTRA_PLANAR, the corresponding intra prediction mode process specified
      in clause 8.4.4.2.5 is invoked with the transform block width nTbW, and the transform block height nTbH,
      the intra prediction reference line index refIdx, and the reference sample array p as inputs, and the output
      is the predicted sample array predSamples.
Otherwise, if predModeIntra is equal to INTRA_DC, the corresponding intra prediction mode process
    specified in clause 8.4.4.2.6 is invoked with the transform block width nTbW, the transform block height
    nTbH, the intra prediction reference line index refIdx, and the reference sample array p as inputs, and the
    output is the predicted sample array predSamples.
Otherwise, if predModeIntra is equal to INTRA_LT_CCLM, INTRA_L_CCLM or INTRA_T_CCLM, the
    corresponding intra prediction mode process specified in clause 8.4.4.2.8 is invoked with the intra
    prediction mode predModeIntra, the sample location ( xTbC, yTbC ) set equal to ( xTbCmp, yTbCmp ), the
    transform block width nTbW and height nTbH, and the reference sample array p as inputs, and the output
    is the predicted sample array predSamples.
Otherwise, the corresponding intra prediction mode process specified in clause 8.4.4.2.7 is invoked with
    the intra prediction mode predModeIntra, the intra prediction reference line index refIdx, the transform
    block width nTbW, the transform block height nTbH, the reference sample width refW, the reference
    sample height refH, the coding block width nCbW and height nCbH, the colour component index cIdx, and
    the reference sample array p as inputs, and the modified intra prediction mode predModeIntra and the
    predicted sample array predSamples as outputs.

In an example, the intra planar mode, the intra DC mode, and the like may be based on the algorithm (or spec) of Table 22 below.

TABLE 22

8.4.4.2.5 Specification of INTRA_PLANAR intra prediction mode

Specification of INTRA_PLANAR intra prediction mode
Inputs to this process are:
    a variable nTbW specifying the transform block width,
    a variable nTbH specifying the transform block height,
    the neighbouring samples p[ x ][ y ], with x = −1−refIdx, y = −1−refIdx..nTbH and
    x = −refIdx..nTbW, y = −1−refIdx.
Outputs of this process are the predicted samples predSamples[ x ][ y ], with x = 0..nTbW −1, y = 0..nTbH − 1.
The variables nW and nH are derived as follows:
    nW = Max( nTbW, 2 )     (8-116)
    nH = Max( nTbH, 2 )     (8-117)
    The values of the prediction samples predSamples[ x ][ y ], with x = 0..nTbW − 1 and y = 0..nTbH − 1,     (8-118)
    are derived as follows:predV[ x ][ y ] = ( ( nH − 1 − y ) * p[ x ][ −1 −refIdx ] + ( y + 1 ) * p[ −1−
    refIdx][ nTbH ] ) << Log2 ( nW )
    predH[ x ][ y ] = ( ( nW − 1 − x ) * p[ −1−refIdx [ y ] + ( x + 1 ) * p[ nTbW ][ −1−     (8-119)
    refIdx ] ) << Log2 ( nH )
    predSamples[ x ][ y ] = ( predV[ x ][ y ] + predH[ x ][ y ] + nW * nH ) >> (Log2 ( nW ) + Log2 ( nH )     (8-120)
    + 1 )

8.4.4.2.6 Specification of INTRA_DC intra prediction mode

Inputs to this process are:
    a variable nTbW specifying the transform block width,
    a variable nTbH specifying the transform block height,
    a variable refIdx specifying the intra prediction reference line index,
    the neighbouring samples p[ x ][ y ], with x = −1−refIdx, y = −1−refIdx..nTbH − 1 and
    x = −refIdx..nTbW − 1 , y = −1−refIdx.
Outputs of this process are the predicted samples predSamples[ x ][ y ], with x = 0..nTbW − 1,
y = 0..nTbH − 1.
The values of the prediction samples predSamples[ x ][ y ], with x = 0..nTbW − 1, y = 0..nTbH − 1, are derived
by the following ordered steps:
1.   A variable dcVal is derived as follows:
    When nTbW is equal to nTbH:
        dcVal = ($\Sigma_{x'=0}^{nTbW-1}$ p[x'][−1 − refIdx] + ($\Sigma_{y'=0}^{nTbH-1}$ p[−1 − refIdx][y'] + nTbW) >>     (8-121)
        (Log2(nTbW) + 1)
    When nTbW is greater than nTbH:
        dcVal = ($\Sigma_{x'=0}^{nTbW-1}$ p[x'][−1 − refIdx] + (nTbW >> 1) ) >> Log2(nTbW)     (8-122)
    When nTbW is less than nTbH:
        dcVal = ($\Sigma_{y'=0}^{nTbH-1}$ p[−1 − refIdx][y'] + (nTbH >> 1) ) >> Log2(nTbH)     (8-123)
2.   The prediction samples predSamples[x][y] are derived as follows:
predSamples[ x ][ y ] = dcVal, with x = 0..nTbW − 1, y = 0..nTbH − 1     (8-124)

In an example, the transformation process of the scaled transform coefficients may be based on the algorithm (or spec) of Table 23 below.

TABLE 23

8.7.4.1 Transformation process for scaled transform coefficients

Inputs to this process are:
    a luma location ( xTbY, yTbY ) specifying the top-left sample of the current luma transform block relative
    to the top-left luma sample of the current picture,
    a variable nTbW specifying the width of the current transform block,
    a variable nTbH specifying the height of the current transform block,
    a variable cIdx specifying the colour component of the current block,
    an (nTbW)x(nTbH) array d[ x ][ y ] of scaled transform coefficients with x = 0..nTbW − 1,
    y= 0..nTbH − 1.
Output of this process is the (nTbW)x(nTbH) array r[ x ][ y ] of residual samples with x = 0..nTbW − 1,
y = 0..nTbH − 1.
The variable implicitMtsEnabled is derived as follows:
    If sps_mts_enabled_flag is equal to 1 and one of the following conditions is true, implicitMtsEnabled is
    set equal to 1:
        IntraSubPartitionsSplitType is not equal to ISP_NO_SPLIT
        cu_sbt_flag is equal to 1 and Max( nTbW, nTbH ) is less than or equal to 32
        sps_explicit_mts_intra_enabled_flag and sps_explicit_mts_inter_enabled_flag are both equal to 0 and
        CuPredMode[ xTbY ][ yTbY ] is equal to MODE_INTRA
    Otherwise, implicitMtsEnabled is set equal to 0.
The variable trTypeHor specifying the horizontal transform kernel and the variable trType Ver specifying the
vertical transform kernel are derived as follows:
    If cIdx is greater than 0, trTypeHor and trType Ver are set equal to 0.
    Otherwise, if implicitMtsEnabled is equal to 1, the following applies:
        If IntraSubPartitionsSplitType is not equal to ISP_NO_SPLIT or
        (sps_explicit_mts_intra_enabled_flag and sps_explicit_mts_inter_enabled_flag are equal to 0),
        trTypeHor and trType Ver are derived as follows

TABLE 23-continued

8.7.4.1 Transformation process for scaled transform coefficients trTypeHor = ( nTbW >=4 && nTbW <= 16 ) ? 1 : 0     (8-1028)
trTypeVer = ( nTbH >= 4 && nTbH <= 16 ) ? 1 : 0     (8-1029)
Otherwise, if cu_sbt_flag is equal to 1, trTypeHor and trType Ver are specified in Table 8-14 depending on cu_sbt_horizontal_flag and cu_sbt_pos_flag.

Table 9.9 - Syntax elements and associated binarizations

| Syntax structure | Syntax element | Binarization Process | Binarization Input parameters |
|---|---|---|---|
| coding_unit( ) | cu_skip_flag[ ][ ] | FL | cMax = 1 |
| | pred_mode_ibc_flag | FL | cMax = 1 |
| | pred_mode_flag | FL | cMax = 1 |
| | pcm_flag[ ][ ] | FL | cMax = 1 |
| | intra_luma_ref_idx[ ][ ] | TR | cMax = 2, cRiceParam = 0 |
| | intra_subpartitions_mode_flag | FL | cMax = 1 |
| | intra_subpartition_split_flag | FL | cMax = 1 |
| | intra_luma_mpm_flag[ ][ ] | FL | cMax = 1 |
| | intra_planar_flag[ ][ ] | FL | cMax =1 |
| | intra_luma_mpm_idx[ ][ ] | TR | cMax = 4, cRiceParam = 0 |
| | intra_luma_mpm_remainder[ ][ ] | TB | cMax = 60 |
| | intra_chroma_pred_mode[ ][ ] | 9.5.3.8 | — |
| | merge_flag[ ][ ] | FL | cMax = 1 |
| | inter_pred_idc[ x0 ][ y0 ] | 9.5.3.9 | cbWidth, cbHeight |

Table 9-5 - Association of ctxIdxOffset and syntax elements for each initializationType in the initialization process

| Syntax structure | Syntax element | ctxTable | initType 0 | initType 1 | initType 2 |
|---|---|---|---|---|---|
| coding_unit( ) | cu_skip_flag[ ][ ] | | | 0 | 3 |
| | pred_mode_ibc_flag | | | | |
| | pred_mode_flag | | | | |
| | intra_luma_ref_idx[ ][ ] | | | | |
| | intra_subpartitions_mode_flag | | | | |
| | intra_subpartition_split_flag | | | | |
| | intra_luma_mpm_flag[ ][ ] | | | | |
| | intra_planar_flag[ ][ ] | | | | |

In an example, an example of allocating ctxInc to syntax elements including context coded bins may be based on Table 24 below.

TABLE 24

| Syntax element | binIdx 0 | binIdx 1 | binIdx 2 | binIdx 3 | binIdx 4 | binIdx >=5 |
|---|---|---|---|---|---|---|
| intra_luma_ref_idx[ ] [ ] | 0 | 1 | na | na | na | na |
| intra_subpartitions_mode_flag | 0 | na | na | na | na | na |
| intra_subpartitions_split_flag | 0 | na | na | na | na | na |
| intra_luma_mpm_flag[ ][ ] | 0 | na | na | na | na | na |
| intra_planar_flag[ ][ ] | intra_luma_ref_idx!=0? 2:(intra_subpartitions_ mode_flag? 0: 1) | na | na | na | na | na |
| intra_luma_mpm_idx [ ][ ] | bypass | bypass | bypass | bypass | bypass | na |
| intra_luma_mpm_remainder[ ][ ] | bypass | bypass | bypass | bypass | bypass | bypass |
| intra_chroma_pred_mode[ ][ ] sps_cclm_enabled_flag = = 0 | 0 | bypass | bypass | na | na | na |

An embodiment proposes a method of performing unified MPM prediction and a method of coding and/or signaling information on a related intra prediction mode. In addition, an embodiment proposes a method of deriving a transform kernel. According to an embodiment, the coding unit syntax written in Tables 16 to 24 may be constructed/encoded and signaled to the decoding apparatus, and the decoding apparatus may derive an intra prediction mode for the current block (CU) based on the coding unit syntax and the MPM list.

For example, according to this embodiment, the planar mode may be included as a candidate mode in the MPM list, and if the value of the MPM flag is 1, a planar flag (intra_planar_flag) may be signaled first and indicate whether or not the planar mode is used as the intra prediction mode of the current block. If the value of the planar flag is 0, the MPM index (intra_luma_mpm_idx) is signaled, and through this, one of the remaining MPM candidates except for the planar mode may be indicated. In this case, in an example, the MPM list including the remaining candidates except for the planar mode may be referred to as a modified MPM list.

If the total number of MPM candidates including the planar mode is 6, the total number of candidates in the modified MPM list from which the planar mode has been excluded may be 5, and in this case, the value of the MPM index may be between 0 and 4. In other words, the maximum value of the MPM index may be set to 4. In this case, the maximum value of the MPM index may be expressed as cMAX of the MPM index. The bin of the planar flag may be regular coded based on a context model as will be described later in Tables 25 to 33, and the value of ctxInc for indicating the context model may be variably determined, as will be described later in Tables 25 to 33, according to i) only one specific value (e.g., 0) is used, or ii) it can be variably derived based on the availability of the left neighboring block and/or the top neighboring block and the value of the planar flag (if available), or iii) whether MRL or ISP is applied. Also, according to this embodiment, a transform kernel (vertical transform kernel/horizontal transform kernel) for the current block may be derived based on the size of the current block and/or the intra prediction type/mode. For example, if the ISP is not applied to the current block or is not available, as will be described later in Tables 25 to 33 below, a transform kernel (vertical transform kernel/horizontal transform kernel) may be derived as a value of 1 or 0 by further referring to the size of the current block.

According to this embodiment, it is possible to construct the MPM list based on the unified MPM prediction without depending on whether MRL, ISP, or the like is applied. Tables 25 to 33 are as follows, and the details of Tables 25 to 33 will be easily understood by those skilled in the art.

Table 25 below shows an example of coding unit syntax.

TABLE 25

| | Descriptor |
|---|---|
| coding_unit( x0, y0, cbWidth, cbHeight, treeType ) { | |
| ... | |
| if( treeType = = SINGLE_TREE | | treeType = = DUAL_TREE_LUMA ) { | |
| if( ( y0 % CtbSizeY ) > 0 ) | |
| intra_luma_ref_idx[ x0 ][ y0 ] | ae(v) |
| if (intra_luma_ref_idx[ x0 ][ y0 ] = = 0 && ( cbWidth <= MaxTbSizeY | | cbHeight <= MaxTbSizeY ) && ( cbWidth * cbHeight > MinTbSizeY * MinTbSize Y )) | |
| intra_subpartitions_mode_flag[ x0 ][ y0 ] | ae(v) |
| if( intra_subpartitions_mode_flag[ x0 ][ y0 ] = = 1 && cbWidth <= MaxTbSizeY && cbHeight <= MaxTbSizeY ) | |
| intra_subpartitions_split_flag[ x0 ][ y0 ] | ae(v) |
| if( intra_luma_ref_idx[ x0 ][ y0 ] = = 0 && intra_subpartitions_mode_flag[ x0 ][ y0 ] = = 0 ) | |
| intra_luma_mpm_flag[ x0 ][ y0 ] | ae(v) |
| if( intra_luma_mpm_flag[ x0 ][ y0 ]) { | |
| if (intra_luma_ref_idx[ x0 ][ y0 ] = = 0) | |
| intra_planar_flag[ x0 ][ y0 ] | ae(v) |
| if (intra_planar_flag==0) | |
| intra_luma_mpm_idx[ x0 ][ y0 ] | ae(v) |
| } | |
| else | |
| intra_luma_mpm_remainder[ x0 ][ y0 ] | ae(v) |
| } | |
| ... | |
| } | |

The coding unit syntax of Table 25 may be based on, for example, the semantics of Table 26 below.

TABLE 26 intra_luma_mpm_flag[ x0 ][ y0 ], intra_planar_flag[ x0 ][ y0 ], intra_luma_mpm_idx[ x0 ][ y0 ] and intra_luma_mpm_remainder[ x0 ][ y0 ] specify the intra prediction mode for luma samples. The array indices x0, y0 specify the location ( x0 , y0 ) of the top-left luma sample of the considered coding block relative to the top-left luma sample of the picture. When intra_luma_mpm_flag[ x0 ][ y0 ] is equal to 1, the intra_planar_flag is parsed. When intra_planar_flag is equal to 1, it specifies that the the variable IntraPredModeY[ xCb ][ yCb ] is equal to INTRA_PLANAR. When intra_planar_flag is equal to 0, the intra prediction mode is inferred from a neighbouring intra-predicted coding unit according to clause 8.4.2. When intra_luma_mpm_flag[ x0 ][ y0 ] is not present, it is inferred to be equal to 1.

In an example, the decoding process of the coding unit coded in the intra prediction mode may be based on the algorithm (or spec) of Table 27 below.

TABLE 27

8.4.1 General decoding process for coding units coded in intra prediction mode

- If pcm_flag[ xCb ][ yCb ] is equal to 0, the following applies:
1. If intra_planar_flag[ x0 ][ y0 ] equal to 1, IntraPredModeY[ xCb ][ yCb ] is equal to INTRA PLANAR.
2. Overwise, the derivation process for the luma intra prediction mode as specified in clause 8.4.2 is invoked with the luma location ( xCb, yCb ), the width of the current coding block in luma samples cb Width and the height of the current coding block in luma samples cbHeight as input. The output is IntraPredMode Y[ xCb ][ yCb ] specifying the luma intra prediciton mode.
With the derivation of IntraPredMode Y[ xCb ][ yCb ] in the previous steps, the general decoding process for intra blocks as specified in clause 8.4.4.1 is invoked with the luma location ( xCb, yCb ), the tree type treeType, the variable nTbW set equal to cb Width, the variable nTbH set equal to cbHeight, the variable predModeIntra set equal to IntraPredModeY[ xCb ][ yCb ], and the variable cIdx set equal to 0 as inputs, and the output is a modified reconstructed picture before in-loop filtering.

<syntax elements and associated binarizations>

| Syntax structure | Syntax element | Binarization | |
|---|---|---|---|
| | | Process | Input parameters |
| coding_unit( ) | intra_planar_flag[ ][ ] | FL | cMax = 1 |

<Assignment of ctxInc to syntax elements with context coded bins>
Case I

| Syntax element | binIdx | | | | | |
|---|---|---|---|---|---|---|
| | 0 | 1 | 2 | 3 | 4 | >= 5 |
| intra_planar_flag[ ][ ] | 0 | na | na | na | na | na |

Case II

The assignment of ctxInc is specified as follows with condL and condA specified in for the syntax element intra_planar_flag[ x0 ][ y0 ]
ctxInc = (condL && availableL ) || (conA && availableA) or ctxInc = (condL && availableL ) && (conA && availableA)
- condL == PLANAR ? 1 : 0
- condA == PLANAR ? 1 : 0
- availableL specifying the availability of the block located directly to the left of the current block.
availableA specifying the availability of the block located directly to the left of the current block.
-

| Syntax element | binIdx | | | | | |
|---|---|---|---|---|---|---|
| | 0 | 1 | 2 | 3 | 4 | >=5 |
| intra_planar_flag[ ][ ] | 0, 1 | na | na | na | na | na |

Case III

The assignment of ctxInc is specified as follows with condL and condA specified in for the syntax element intra_planar_flag[ x0 ][ y0 ]
ctxInc = (condL && availableL ) + (conA && availableA)
- condL == PLANAR ? 1 : 0
- condA == PLANAR ? 1 : 0
- availableL specifying the availability of the block located directly to the left of the current block.
availableA specifying the availability of the block located directly to the left of the current block.

| Syntax element | binIdx | | | | | |
|---|---|---|---|---|---|---|
| | 0 | 1 | 2 | 3 | 4 | >= 5 |
| intra_planar_flag[ ][ ] | 0, 1, 2 | na | na | na | na | na |

The above embodiment (case I, case II, and case III) is just only one practical example, the number of context models can be arbitrariliy determined.

In an example, the process of deriving the luma intra prediction mode may be based on the algorithm (or spec) of Table 28 below.

TABLE 28

8.4.2 Derivation process for luma intra prediction mode

Derivation process for luma intra prediction mode
Input to this process are:
  a luma location ( xCb , yCb ) specifying the top-left sample of the current luma coding block relative to the
  top-left luma sample of the current picture,
  a variable cbWidth specifying the width of the current coding block in luma samples,
  a variable cbHeight specifying the height of the current coding block in luma samples.
In this process, the luma intra prediction mode IntraPredModeY[ xCb ][ yCb ] is derived.
Table 8-1 specifies the value for the intra prediction mode IntraPredModeY[ xCb ][ yCb ] and the associated names.

Table 8-1-Specification of intra prediction mode and associated names

| Intra prediction mode | Associated name |
|---|---|
| 0 | INTRA_PLANAR |
| 1 | INTRA_DC |
| 2 ... 66 | INTRA_ANGULAR2 . . . INTRA_ANGULAR66 |
| 81 ... 83 | INTRA_LT_CCLM, INTRA_L_CCLM, INTRA_T_CCLM |

IntraPredMode Y[ xCb ][ yCb ] is derived by the following ordered steps:
  1. The neighbouring locations ( xNbA, yNbA ) and ( xNbB, yNbB ) are set equal to
     ( xCb − 1, yCb + cbHeight − 1 ) and ( xCb + cbWidth −1, yCb − 1 ), respectively.
  2. For X being replaced by either A or B, the variables candIntraPredModeX are derived as follows:
       The availability derivation process for a block as specified in clause 6.4.X [Ed. (BB):
       Neighbouring blocks availability checking process tbd] is invoked with the location
       ( xCurr, yCurr ) set equal to ( xCb, yCb ) and the neighbouring location ( xNbY, yNbY ) set equal
       to ( xNbX, yNbX ) as inputs, and the output is assigned to availableX.
       The candidate intra prediction mode candIntraPredModeX is derived as follows:
         If one or more of the following conditions are true, candIntraPredModeX is set equal to
           INTRA_PLANAR.
             The variable availableX is equal to FALSE.
             CuPredMode[ xNbX ][ yNbX ] is not equal to MODE_INTRA
             pcm_flag[ xNbX ][ yNbX ] is equal to 1.
             X is equal to B and yCb − 1 is less than ( ( yCb >> CtbLog2SizeY ) << CtbLog2SizeY ).
         Otherwise, candIntraPredModeX is set equal to IntraPredMode Y[ xNbX ][ yNbX ].
  3. The candModeList[ x ] with x = 0..4 is derived as follows:
       If candIntraPredModeB is equal to candIntraPredModeA and candIntraPredModeA is greater than
         INTRA_DC, candModeList[ x ] with x = 0..4 is derived as follows:
           candModeList[ 0 ] = candIntraPredModeA                                    (8-10)
           candModeList[ 1 ] = 2 + ( ( candIntraPredModeA + 61 ) % 64 )              (8-12)
           candModeList[ 2 ] = 2 + ( ( candIntraPredModeA − 1 ) % 64 )               (8-13)
           candModeList[ 3 ] = INTRA_DC                                              (8-11)
           candModeList[ 4 ] = 2 + ( ( candIntraPredModeA + 60 ) % 64 )              (8-14)
       Otherwise if candIntraPredModeB is not equal to candIntraPredModeA and candIntraPredModeA or
         candIntraPredModeB is greater than INTRA_DC, the following applies:
           The variables minAB and maxAB are derived as follows:
             minAB = Min( candIntraPredModeA, candIntraPredModeB )                   (8-24)
             maxAB = Max( candIntraPredModeA, candIntraPredModeB )                   (8-25)
           If candIntraPredModeA and candIntraPredModeB are both greater than INTRA_DC,
             candModeList[ x ] with x = 0..4 is derived as follows:
               candModeList[ 0 ] = candIntraPredModeA                                (8-27)
               candModeList[ 1 ] = candIntraPredModeB
               candModeList[ 2 ] = INTRA_DC                                          (8-29)
               If maxAB − minAB is in the range of 2 to 62, inclusive, the following applies:
                 candModeList[ 3 ] = 2 + ( ( maxAB + 61 ) % 64 )                     (8-30)
                 candModeList[ 4 ] = 2 + ( ( maxAB − 1 ) % 64 )                      (8-31)
               Otherwise, the following applies:
                 candModeList[ 3 ] = 2 + ( ( maxAB + 60) % 64 )                      (8-32)
                 candModeList[ 4 ] = 2 + ( ( maxAB ) % 64 )                          (8-33)
           Otherwise (candIntraPredModeA or candIntraPredModeB is greater than INTRA_DC),
             candModeList[ x ] with x = 0..4 is derived as follows:
               candModeList[ 0 ] = maxAB                                             (8-65)
               candModeList[ 1 ] = INTRA_DC                                          (8-66)
               candModeList[ 2 ] = 2 + ( ( maxAB + 61 ) % 64 )                       (8-66)
               candModeList[ 3 ] = 2 + ( ( maxAB − 1 ) % 64 )                        (8-67)
               candModeList[ 4 ] = 2 + ( ( maxAB + 60 ) % 64 )                       (8-68)
       Otherwise, the following applies:
         candModeList[ 0 ] = INTRA_DC                                                (8-71)
         candModeList[ 1 ] = INTRA_ANGULAR50                                         (8-72)

TABLE 28-continued

8.4.2 Derivation process for luma intra prediction mode

| | | |
|---|---|---|
| candModeList[ 2 ] = INTRA_ANGULAR18 | | (8-73) |
| candModeList[ 3 ] = INTRA_ANGULAR46 | | (8-74) |
| candModeList[ 4 ] = INTRA_ANGULAR54 | | (8-75) |
| (8-81) | | |

4. IntraPredMode Y[ xCb ][ yCb ] is derived by applying the following procedure:
    If intra_luma_mpm_flag[ xCb ][ yCb ] is equal to 1, the IntraPredMode Y[ xCb ][ yCb ] is set
    equal to candModeList[ intra_luma_mpm_idx[ xCb ][ yCb ] ].
    Otherwise, IntraPredMode Y[ xCb ][ yCb ] is derived by applying the following ordered steps:

1. When candModeList[ i ] is greater than candModeList[ j ] for i = 0..4 and for each i, j = ( i + 1)..5,
both values are swapped as follows:

( candModeList[ i ], candModeList[ j ] ) = Swap( candModeList[ i ],     (8-94)
    candModeList[ j ] )

2. IntraPredMode Y[ xCb ][ yCb ] is derived by the following ordered steps:
    i. IntraPredMode Y[ xCb ][ yCb ] is set equal to
    intra_luma_mpm_remainder[ xCb ][ yCb ].
    ii. For i equal to 0 to 5, inclusive, when IntraPredModeY[ xCb ][ yCb ] is greater than or
    equal to candModeList[ i ], the value of IntraPredModeY[ xCb ][ yCb ] is
    incremented by one.

The variable IntraPredMode Y[ x ][ y ] with x = xCb..xCb + cbWidth − 1 and y = yCb..yCb + cbHeight − 1
is set to be equal to IntraPredMode Y[ xCb ][ yCb ].

NOTE
The intra prediction modes INTRA_LT_CCLM, INTRA_L_CCLM and INTRA_T_CCLM are only applicable to chroma components.

In an example, the decoding process of intra blocks may be based on the algorithm (or spec) of Table 29 below.

TABLE 29

8.4.4.1 General decoding process for intra blocks... For xPartIdx = 0..numPartsX 1
and yPartIdx = 0..numPartsY −1, the following applies:The general intra sample
prediction process as specified in clause 8.4.4.2.1 is invoked with the location
( xTbCmp, yTbCmp ) set equal to
( xTb0 + nW * xPartIdx, yTb0 + nH * yPartIdx ), the intra prediction mode
predModeIntra, the transform block width nTbW and height nTbH set equal to nW
and nH, the coding block width nCbW and height nCbH set equal to nTbW and
nTbH, and the variable cIdx as inputs, and the output is an (nTbW)x(nTbH) array
predSamples.

In an example, intra-sample prediction may be based on the algorithm (or spec) of Table 30 below.

TABLE 30

8.4.4.2.1 General intra sample prediction

The intra sample prediction process according to predModeIntra applies as follows:
  If predModeIntra is equal to INTRA_PLANAR, the corresponding intra prediction mode process specified
  in clause 8.4.4.2.5 is invoked with the transform block width nTbW, and the transform block height nTbH,
  the intra prediction reference line index refIdx, and the reference sample array p as inputs, and the output
  is the predicted sample array predSamples.
  Otherwise, if predModeIntra is equal to INTRA_DC, the corresponding intra prediction mode process
  specified in clause 8.4.4.2.6 is invoked with the transform block width nTbW, the transform block height
  nTbH, the intra prediction reference line index refIdx, and the reference sample array p as inputs, and the
  output is the predicted sample array predSamples.
  Otherwise, if predModeIntra is equal to INTRA_LT_CCLM, INTRA_L_CCLM or INTRA_T_CCLM, the
  corresponding intra prediction mode process specified in clause 8.4.4.2.8 is invoked with the intra
  prediction mode predModeIntra, the sample location ( xTbC, yTbC ) set equal to ( xTbCmp, yTbCmp ), the
  transform block width nTbW and height nTbH, and the reference sample array p as inputs, and the output
  is the predicted sample array predSamples.
  Otherwise, the corresponding intra prediction mode process specified in clause 8.4.4.2.7 is invoked with
  the intra prediction mode predModeIntra, the intra prediction reference line index refIdx, the transform
  block width nTbW, the transform block height nTbH, the reference sample width refW, the reference
  sample heigh refH, the coding block width nCbW and height nCbH, the colour component index cIdx, and
  the reference sample array p as inputs, and the modified intra prediction mode predModeIntra and the
  predicted sample array predSamples as outputs.

In an example, the intra planar mode, the intra DC mode, and the like may be based on the algorithm (or spec) of Table 31 below.

TABLE 31

8.4.4.2.5 Specification of INTRA_PLANAR intra prediction mode

Specification of INTRA_PLANAR intra prediction mode
Inputs to this process are:
    a variable nTbW specifying the transform block width,
    a variable nTbH specifying the transform block height,
    a variable refIdx specifying the intra prediction reference line index,
    the neighbouring samples p[ x ][ y ], with x = −1−refIdx, y = −1−refIdx..nTbH and
    x = −refIdx..nTbW, y = −1−refIdx.
Outputs of this process are the predicted samples predSamples[ x ][ y ], with x = 0..nTbW − 1, y = 0..nTbH − 1.
The variables nW and nH are derived as follows:
    nW = Max( nTbW, 2 )     (8-116)
    nH = Max( nTbH, 2 )     (8-117)
    The values of the prediction samples predSamples[ x ][ y ], with x = 0..nTbW − 1 and y = 0..nTbH − 1,     (8-118)
    are derived as follows:predV[ x ][ y ] = ( ( nH − 1 − y ) * p[ x ][ −1 −refIdx] + ( y + 1 ) * p[ −1−
    refIdx][ nTbH ] ) << Log2 ( nW )
    predH[ x ][ y ] = ( ( nW − 1 − x ) * p[ −1−refIdx ][ y ] + ( x + 1 ) * p[ nTbW ][ −1−     (8-119)
    refIdx ] ) << Log2 ( nH )
    predSamples[ x ][ y ] = ( predV[ x ][ y ] + predH[ x ][ y ] + nW * nH ) >> (Log2 ( nW ) + Log2 ( nH )     (8-120)
    + 1 )

8.4.4.2.6 Specification of INTRA_DC intra prediction mode

Inputs to this process are:
    a variable nTbW specifying the transform block width,
    a variable nTbH specifying the transform block height,
    a variable refIdx specifying the intra prediction reference line index,
    the neighbouring samples p[ x ][ y ], with x = −1−refIdx, y = −1−refIdx..nTbH − 1 and
    x = −refIdx..nTbW − 1 , y = −1−refIdx.
Outputs of this process are the predicted samples predSamples[ x ][ y ], with x = 0..nTbW − 1,
y = 0..nTbH − 1.
The values of the prediction samples predSamples[ x ][ y ], with x = 0..nTbW − 1, y = 0..nTbH − 1, are derived
by the following ordered steps:
1.    A variable dcVal is derived as follows:
    When nTbW is equal to nTbH:
        dcVal = ($\Sigma_{x'=0}^{nTbW-1}$ p[x'][−1 − refIdx] + $\Sigma_{y'=0}^{nTbH-1}$ p[−1 − refIdx][y'] + nTbW) >>     (8-121)
        (Log2(nTbW) + 1)
    When nTbW is greater than nTbH:
        dcVal = ($\Sigma_{x'=0}^{nTbW-1}$ p[x'][−1 − refIdx] + (nTbW >> 1) ) >> Log2 (nTbW)     (8-122)
    When nTbW is less than nTbH:
        dcVal = ($\Sigma_{y'=0}^{nTbH-1}$ p[−1 − refIdx][y'] + (nTbH >> 1) ) >> Log2(nTbH)     (8-123)
2.    The prediction samples predSamples[ x ][ y ] are derived as follows:
predSamples[ x ][ y ] = dcVal, with x = 0..nTbW − 1, y = 0..nTbH − 1     (8-124)

In an example, the transformation process of the scaled transform coefficients may be based on the algorithm (or spec) of Table 32 below.

TABLE 32

8.7.4.1 Transformation process for scaled transform coefficients

Inputs to this process are:
    a luma location ( xTbY, yTbY ) specifying the top-left sample of the current luma transform block relative
    to the top-left luma sample of the current picture,
    a variable nTbW specifying the width of the current transform block,
    a variable nTbH specifying the height of the current transform block,
    a variable cIdx specifying the colour component of the current block,
    an (nTbW)x(nTbH) array d[ x ][ y ] of scaled transform coefficients with x = 0..nTbW − 1,
    y = 0..nTbH − 1.
Output of this process is the (nTbW)x(nTbH) array r[ x ][ y ] of residual samples with x = 0..nTbW − 1,
y = 0..nTbH − 1.
The variable implicitMtsEnabled is derived as follows:
    If sps_mts_enabled_flag is equal to 1 and one of the following conditions is true, implicitMtsEnabled is
    set equal to 1:
        IntraSubPartitionsSplitType is not equal to ISP_NO_SPLIT
        cu_sbt_flag is equal to 1 and Max( nTbW, nTbH ) is less than or equal to 32
        sps_explicit_mts_intra_enabled_flag and sps_explicit_mts_inter_enabled_flag are both equal to 0 and
        CuPredMode[ xTbY ][ yTbY ] is equal to MODE_INTRA
    Otherwise, implicitMtsEnabled is set equal to 0.
The variable trTypeHor specifying the horizontal transform kernel and the variable trType Ver specifying the
vertical transform kernel are derived as follows:
    If cIdx is greater than 0, trTypeHor and trType Ver are set equal to 0.
    Otherwise, if implicitMtsEnabled is equal to 1, the following applies:
        If IntraSubPartitionsSplitType is not equal to ISP_NO_SPLIT to or
        (sps_explicit_mts_intra_enabled_flag and sps_explicit_mts_inter_enabled_flag are equal to 0),
        trTypeHor and trType Ver are derived as follows TABLE 32-continued 8.7.4.1 Transformation process for scaled transform coefficients trTypeHor = ( nTbW >= 4 && nTbW <= 16 ) ? 1 : 0   (8-1028)
trTypeVer = ( nTbH >= 4 && nTbH <= 16 ) ? 1 : 0   (8-1029)
Otherwise, if cu_sbt_flag is equal to 1, trTypeHor and trType Ver are specified in Table 8-14 depending on cu_sbt_horizontal_flag and cu_sbt_pos_flag.

Table 9.9 - Syntax elements and associated binarizations

| Syntax structure | Syntax element | Process | Input parameters |
|---|---|---|---|
| coding_unit( ) | cu_skip_flag[ ][ ] | FL | cMax = 1 |
| | pred_mode_ibc_flag | FL | cMax = 1 |
| | pred_mode_flag | FL | cMax = 1 |
| | pcm_flag[ ][ ] | FL | cMax = 1 |
| | intra_luma_ref_idx[ ][ ] | TR | cMax = 2, cRiceParam = 0 |
| | intra_subpartitions_mode_flag | FL | cMax = 1 |
| | intra_subpartition_split_flag | FL | cMax = 1 |
| | intra_luma_mpm_flag[ ][ ] | FL | cMax = 1 |
| | intra_planar_flag[ ][ ] | FL | cMax=1 |
| | intra_luma_mpm_idx[ ][ ] | TR | cMax = 4, cRiceParam = 0 |
| | intra_luma_mpm_remainder[ ][ ] | TB | cMax = 60 |
| | intra_chroma_pred_mode[ ][ ] | 9.5.3.8 | — |
| | merge_flag[ ][ ] | FL | cMax = 1 |
| | inter_pred_idc[ x0 ][ y0 ] | 9.5.3.9 | cbWidth, cbHeight |

Table 9-5 - Association of ctxIdxOffset and syntax elements for each initializationType in the initialization process

| Syntax structure | Syntax element | ctxTable | initType | | |
|---|---|---|---|---|---|
| | | | 0 | 1 | 2 |
| coding_unit( ) | cu_skip_flag[ ][ ] | | | 0 | 3 |
| | pred_mode_ibc_flag | | | | |
| | pred_mode_flag | | | | |
| | intra_luma_ref_idx[ ][ ] | | | | |
| | intra_subpartitions_mode_flag | | | | |
| | intra_subpartition_split_flag | | | | |
| | intra_luma_mpm_flag[ ][ ] | | | | |
| | intra_planar_flag[ ][ ] | | | | |

In an example, an example of allocating ctxInc to syntax elements including context coded bins may be based on Table 33 below.

TABLE 33

| Syntax element | binIdx | | | | | |
|---|---|---|---|---|---|---|
| | 0 | 1 | 2 | 3 | 4 | >=5 |
| intra_luma_ref_idx[ ][ ] | 0 | 1 | na | na | na | na |
| intra_subpartitions_mode_flag | 0 | na | na | na | na | na |
| intra_subpartitions_split_flag | 0 | na | na | na | na | na |
| intra_luma_mpm_flag[ ][ ] | 0 | na | na | na | na | na |
| intra_planar_flag[ ][ ] | intra_luma_ref_idx!=0? 2:(intra_subpartitions_ mode_flag? 0: 1) | na | na | na | na | na |
| intra_luma_mpm_idx [ ][ ] | bypass | bypass | bypass | bypass | bypass | na |
| intra_luma_mpm_remainder[ ][ ] | bypass | bypass | bypass | bypass | bypass | bypass |
| intra_chroma_pred_mode[ ][ ] sps_cclm_enabled_flag = = 0 | 0 | bypass | bypass | na | na | na |

Referring to Table 25, it can be confirmed that intra_planar_flag is checked based on the check result that the value of intra_luma_ref_idx is 0. The intra_luma_ref_idx may indicate an example of a multi-reference line (MRL) index, and the intra_planar_flag may indicate an example of a planar flag.

Referring to Table 27, it can be confirmed that a value of a context index (ctxInc or ctxIdx) for a bin associated with intra_planar_flag is 0 or 1. That is, it can be confirmed that the value of the context index for the bin associated with intra_planar_flag may be one of two different integers.

Referring to Table 33, it can be confirmed that the context index for a bin associated with intra_planar_flag is based on a value of intra_subpartitions_mode_flag. The intra_subpartitions_mode_flag may be an example of an ISP flag relating to whether or not an Intra Sub Partition (ISP) mode is applied to the current block.

Figure 11:
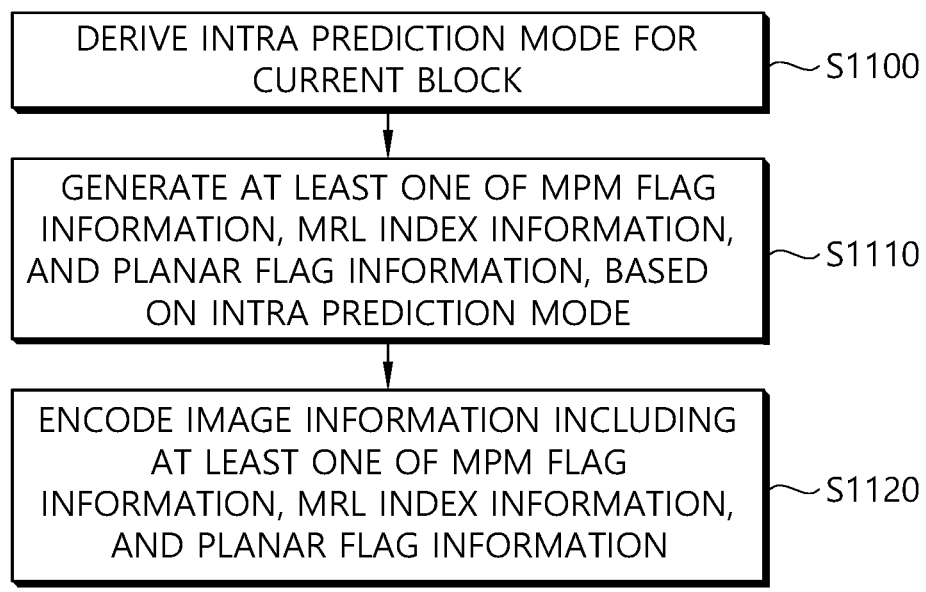
FIG. 11 is a flowchart showing operation of an encoding apparatus according to an embodiment.
Figure 12:
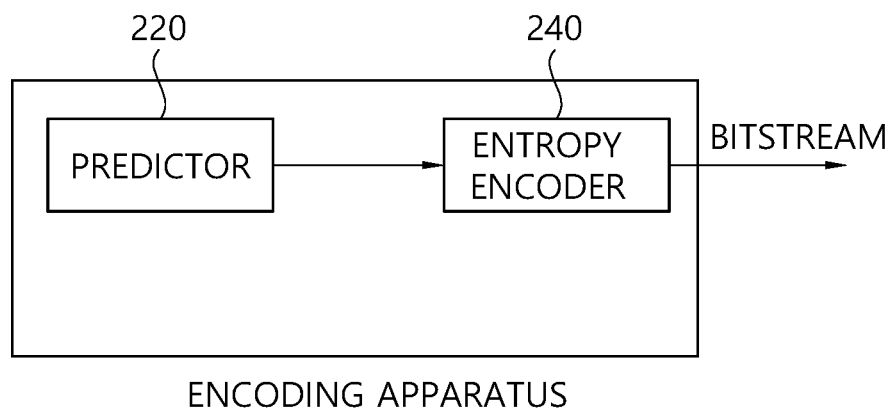
FIG. 12 is a block diagram showing a configuration of an encoding apparatus according to an embodiment.

FIG. 11 is a flowchart showing operation of an encoding apparatus according to an embodiment, and FIG. 12 is a block diagram showing configuration of an encoding apparatus according to an embodiment.

Figure 13:
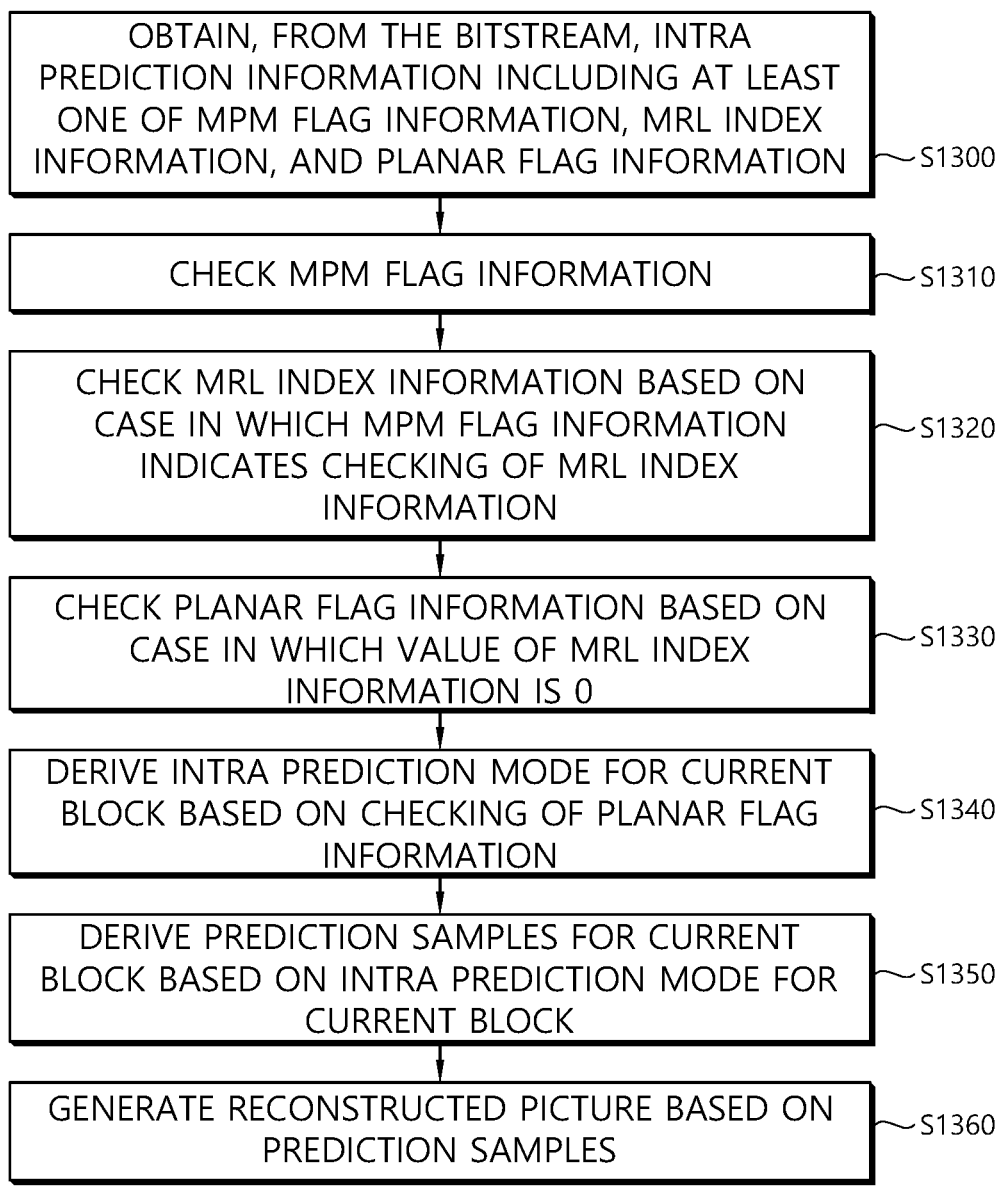
FIG. 13 is a flowchart showing operation of a decoding apparatus according to an embodiment.
Figure 14:
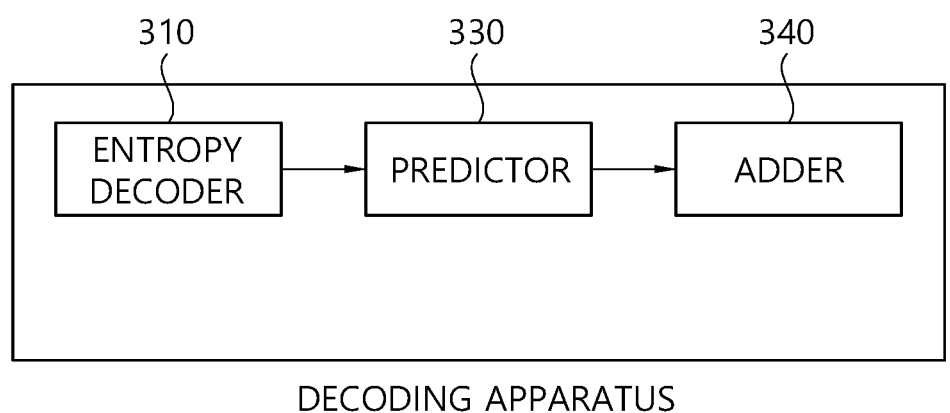
FIG. 14 is a block diagram showing a configuration of a decoding apparatus according to an embodiment.

The encoding apparatus according to FIGS. 11 and 12 may perform operations corresponding to those of a decoding apparatus according to FIGS. 13 and 14. Therefore, operations of the decoding apparatus to be described later in FIGS. 13 and 14 may be similarly applied to the encoding apparatus according to FIGS. 11 and 12.

Each step disclosed in FIG. 11 may be performed by the encoding apparatus 200 disclosed in FIG. 2. Furthermore, operations according to S1100 to S1120 are based on some of contents described above in FIGS. 4 to 10. Therefore, an explanation for the specific content duplicated with contents described in FIGS. 2, and 4 to 10 above will be omitted or made briefly.

As shown in FIG. 11, the encoding apparatus according to an embodiment may include the predictor 220 and the entropy encoder 240. However, in some cases, all of the components shown in FIG. 11 may not be essential components of the encoding apparatus, and the encoding apparatus may be implemented by more or less components than those shown in FIG. 11.

In the encoding apparatus according to an embodiment, the predictor 220 and the entropy encoder 240 may be implemented by separate chips, or at least two or more components may be implemented by a single chip.

The encoding apparatus according to an embodiment may derive an intra prediction mode for the current block (S1100). More specifically, the predictor 220 of the encoding apparatus may derive an intra prediction mode for the current block.

The encoding apparatus according to an embodiment may generate, based on the intra prediction mode, at least one of MPM flag information relating to whether or not to encode the intra prediction mode based on MPM candidates for the current block, multi-reference line (MRL) index information for at least one reference sample line for intra prediction of the current block, and planar flag information relating to whether or not the derived intra prediction mode for the current block is a planar mode (S1110).

For example, the encoding apparatus may generate MPM flag information relating to whether or not to encode the intra prediction mode, based on MPM candidates for the current block, and the encoding apparatus may generate the MRL index information based on a case in which the MPM flag information indicates that the MPM flag information is associated with multi-reference line (MRL) index information for at least one reference sample line for intra prediction for the current block, and the encoding apparatus may generate planar flag information relating to whether the derived intra prediction mode for the current block is a PLANAR mode, based on a check result that the value of the MRL index information is 0.

The encoding apparatus according to an embodiment may encode image information including at least one of the MPM flag information, the MRL index information, and the planar flag information (S1120). More specifically, the entropy encoder 240 of the encoding apparatus may encode image information including at least one of the MPM flag information, the MRL index information, and the planar flag information.

The encoding apparatus according to an embodiment may derive MPM index information associated with one of the MPM candidates for the current block from which the planar mode has been excluded, based on a case in which the value of the planar flag information indicates that the intra prediction mode for the current block is not derived as the planar mode.

In an embodiment, the number of the MPM candidates for the current block from which the planar mode has been excluded may be five.

In an embodiment, the encoding apparatus may derive the intra prediction mode for the current block based on the MPM candidates for the current block from which the planar mode has been excluded, and based on a case in which the value of the MRL index information indicates non-zero.

In an embodiment, the value of the planar flag information may be derived based on a context model for a bin associated with the planar flag information, and the context model for a bin associated with the planar flag information may be derived based on a context index increment (ctxInc), and the context index increment for the bin associated with the planar flag information may be selected from two candidates based on a case in which the bin index of the bin is 0, and the candidates may include 0 and 1, and the context model for a case in which the context index increment is 0 may be different from the context model for a case in which the context index increment is 1, and the value of the context index increment for a bin associated with the planar flag information may be one of two different integers which may be 0 and 1.

In an embodiment, the value of the context index increment for the bin associated with the planar flag information may be based on whether or not an ISP mode is applied to the current block.

In an embodiment, the value of the context index increment may be determined to be 1 based on a determination that the ISP mode is applied to the current block, and the value of the context index increment may be determined to be 0 based on a determination that the ISP mode is not applied to the current block.

According to the encoding apparatus and the operation method of the encoding apparatus of FIGS. 11 and 12, the encoding apparatus may derive an intra prediction mode for the current block (S1100), generate, based on the intra prediction mode, at least one of MPM flag information relating to whether or not to encode the intra prediction mode based on MPM candidates for the current block, multi-reference line (MRL) index information for at least one reference sample line for intra prediction of the current block, and planar flag information relating to whether or not the derived intra prediction mode for the current block is a planar (PLANAR) mode (S1110), and encode image information including at least one of the MPM flag information, the MRL index information, and the planar flag information (S1120).

That is, according to this disclosure, it is possible to increase the efficiency of the MPM list-based intra prediction based on the planar flag information relating to whether or not to determine the intra prediction mode for the current block to be the planar mode. Alternatively, according to this disclosure, it is possible to increase image coding efficiency by determining whether or not to signal planar flag information, based on MRL index information. Alternatively, according to this disclosure, it is possible to efficiently construct the MPM list for the current block. Alternatively, according to this disclosure, the value of the context index for the bin associated with the planar flag information may be determined based on whether or not the ISP mode is applied to the current block.

FIG. 13 is a flowchart showing operation of a decoding apparatus according to an embodiment, and FIG. 14 is a block diagram showing configuration of a decoding apparatus according to an embodiment.

Each of steps disclosed in FIG. 13 may be performed by the decoding apparatus 300 disclosed in FIG. 3. Therefore, an explanation for the specific content duplicated with contents described above 3 will be omitted or made briefly.

As shown in FIG. 14, the decoding apparatus according to an embodiment may include the entropy decoder 310, the predictor 330, and the adder 340. However, in some cases, all of the components shown in FIG. 14 may not be essential components of the decoding apparatus, and the decoding apparatus may be implemented by more or less components than those shown in FIG. 14.

In the decoding apparatus according to an embodiment, the entropy decoder 310, the predictor 330, and the adder 340 may be implemented by separate chips, or at least two or more components may be implemented by a single chip.

According to an embodiment, the decoding apparatus may obtain, from the bitstream, intra prediction information including at least one of MPM flag information relating to whether or not to derive an intra prediction mode for a current block based on most probable mode (MPM) candidates for the current block, multi-reference line (MRL) index information for at least one reference sample line for intra prediction of the current block, and planar (PLANAR) flag information relating to whether or not to determine the intra prediction mode for the current block to be a planar mode (S1300). More specifically, the entropy decoder 310 of the decoding apparatus may obtain, from the bitstream, intra prediction information including at least one of MPM flag information relating to whether or not to derive an intra prediction mode for a current block based on MPM candidates for the current block, MRL index information for at least one reference sample line for intra prediction of the current block, and planar flag information indicating whether or not to determine the intra prediction mode for the current block to be a planar mode.

In an example, the intra prediction information may be included in a coding unit syntax.

In an example, the MPM flag information may be denoted as intra_luma_mpm_flag; the MRL index information may be denoted as intra_luma_ref_idx; and the planar flag information may be denoted as intra_luma_not_planar_flag. When the value of the intra_luma_not_planar_flag is 1, the intra prediction mode for the current block may be determined not to be the planar mode, while, when the value of the intra_luma_not_planar_flag is 0, the intra prediction mode for the current block may be determined to be a planar mode.

In another example, the planar flag information may be denoted as intra_luma_planar_flag or intra_planar_flag. When the value of the intra_luma_planar_flag is 1, the intra prediction mode for the current block may be determined to be the planar mode, while, when the value of the intra_luma_planar_flag is 0, the intra prediction mode for the current block may be determined not to be a planar mode.

The decoding apparatus according to an embodiment may check the MPM flag information (S1310). More specifically, the entropy decoder 310 of the decoding apparatus may check the MPM flag information. In other words, the decoding apparatus may decode or parse the MPM flag information.

The decoding apparatus according to an embodiment may check the MRL index information based on a case in which the MPM flag information indicates checking of the MRL index information (S1320). More specifically, the entropy decoder 310 of the decoding apparatus may check the MRL index information based on a check result that the value of the MPM flag information is associated with checking of the MRL index information.

In an example, the decoding apparatus may determine that the value of the MPM flag information is associated with checking the MRL index information, based on the determination that the value of the MPM flag information is 1. That is, the decoding apparatus may check the MRL index information based on the determination that the value of the MPM flag information is 1.

The decoding apparatus according to an embodiment may check the planar flag information based on a case in which the value of the MRL index information is 0 (S1330). More specifically, the entropy decoder 310 of the decoding apparatus may check the planar flag information based on a check result that the value of the MRL index information is 0.

In one example, the decoding apparatus may determine that a multi-reference line (MRL) is not used for intra prediction for the current block, based on a check result that the value of the MRL index information is 0.

The decoding apparatus according to an embodiment may derive the intra prediction mode for the current block based on the checking of the planar flag information (S1340). More specifically, the predictor 330 of the decoding apparatus may derive the intra prediction mode for the current block based on the checking of the planar flag information.

The decoding apparatus according to an embodiment may derive prediction samples for the current block based on the intra prediction mode for the current block (S1350). More specifically, the predictor 330 of the decoding apparatus may derive prediction samples for the current block based on the intra prediction mode for the current block.

The decoding apparatus according to an embodiment may generate a reconstructed picture based on the prediction samples (S1360). More specifically, the adder 340 of the decoding apparatus may generate a reconstructed picture based on the prediction samples.

The decoding apparatus according to an embodiment, when deriving the intra prediction mode for the current block, may derive the intra prediction mode for the current block as the planar mode, based on a case in which the planar flag information indicates that the intra prediction mode for the current block is derived as the planar mode. In an example, the decoding apparatus may derive the intra prediction mode for the current block as the planar mode, based on a check result that the value of intra_luma_not_planar_flag is 0.

In an embodiment, the intra prediction information further includes MPM index information associated with one of the MPM candidates for the current block from which the planar mode has been excluded, and the decoding apparatus according to an embodiment, when deriving the intra prediction mode for the current block, may check the MPM index information, based on a case indicating that the intra prediction mode for the current block is not derived as the planar mode, and derive the intra prediction mode for the current block, based on the result of checking the MPM index information. In an example, the decoding apparatus may check the MPM index information, based on a check result that the value of the intra_luma_not_planar_flag is 1.

In an embodiment, the number of the MPM candidates for the current block from which the planar mode has been excluded may be five. In an example, the MPM candidates may include first to fifth MPM candidates. The first MPM candidate may be associated with MPM index 0; the second MPM candidate may be associated with MPM index 1; the third MPM candidate may be associated with MPM index 2; and the fourth MPM candidate may be associated with MPM index 3.

The decoding apparatus according to an embodiment may derive the intra prediction mode for the current block based on the MPM candidates for the current block from which the planar mode has been excluded, and based on a case in which the value of the MRL index information indicates non-zero.

In an embodiment, the value of the planar flag information may be derived based on a context model for a bin associated with the planar flag information, and the context model for a bin associated with the planar flag information may be derived based on a context index increment (ctxInc), and the context index increment for the bin associated with the planar flag information may be selected from two candidates based on a case in which the bin index of the bin is 0, and the candidates may include 0 and 1, and the context model for a case in which the context index increment is 0 may be different from the context model for a case in which the context index increment is 1, and the value of the context index increment for a bin associated with the planar flag information may be one of two different integers. In an example, the value of the context index increment for the bin associated with intra_luma_not_planar_flag may be one of two different integers. Here, the context index increment may mean ctxInc.

In an embodiment, the two different integers may be 0 and 1. That is, the value of the context index increment for the bin associated with the planar flag information may be 0 or 1.

In an embodiment, the value of the context index increment for the bin associated with the planar flag information may be based on whether or not an Intra Sub Partition (ISP) mode is applied to the current block. In an example, the value of the context index increment for the bin associated with the planar flag information may be based on a value of an ISP flag relating to whether or not an ISP mode is applied to the current block. The ISP flag may be expressed, for example, as intra_subpartitions_mode_flag.

In an embodiment, the value of the context index increment may be determined to be 1 based on a determination that the ISP mode is applied to the current block, and the value of the context index increment may be determined to be 0 based on a determination that the ISP mode is not applied to the current block. In an example, the value of the context index increment may be determined to be 1 based on the determination that the value of intra_subpartitions_mode_flag is 1, and the value of the context index increment may be determined to be 0 based on the determination that the value of intra_subpartitions_mode_flag is 0.

According to the decoding apparatus and the operation method of the decoding apparatus disclosed in FIGS. 13 and 14, the decoding apparatus may obtain, from a bitstream, intra prediction information including at least one of MPM flag information relating to whether or not to derive an intra prediction mode for a current block based on MPM candidates for the current block, MRL index information for at least one reference sample line for intra prediction of the current block, and planar (PLANAR) flag information relating to whether or not to determine the intra prediction mode for the current block to be a planar mode (S1300), check the MPM flag information (S1310), check the MRL index information based on a case in which the value of the MPM flag information indicates checking of the MRL index information (S1320), check the planar flag information, based on a case in which the value of the MRL index information is 0 (S1330), derive the intra prediction mode for the current block, based on the checking of the planar flag information (S1340), derive prediction samples for the current, block based on the intra prediction mode for the current block (S1350), and generate the reconstructed picture based on the prediction samples (S1360).

That is, according to this disclosure, it is possible to increase the efficiency of the MPM list-based intra prediction based on the planar flag information relating to whether or not to determine the intra prediction mode for the current block to be the planar mode. Alternatively, according to this disclosure, it is possible to increase image coding efficiency by determining whether or not to signal planar flag information, based on MRL index information. Alternatively, according to this disclosure, it is possible to efficiently construct the MPM list for the current block. Alternatively, according to this disclosure, the value of the context index for the bin associated with the planar flag information may be determined based on whether or not the ISP mode is applied to the current block.

Although methods have been described on the basis of a flowchart in which steps or blocks are listed in sequence in the above-described embodiments, the steps of the present disclosure are not limited to a certain order, and a certain step may be performed in a different step or in a different order or concurrently with respect to that described above. Further, it will be understood by those ordinary skilled in the art that the steps of the flowcharts are not exclusive, and another step may be included therein or one or more steps in the flowchart may be deleted without exerting an influence on the scope of the present disclosure.

The aforementioned method according to the present disclosure may be in the form of software, and the encoding apparatus and/or decoding apparatus according to the present disclosure may be included in a device for performing image processing, for example, a TV, a computer, a smart phone, a set-top box, a display device, or the like.

When the embodiments are implemented in software in the present disclosure, the aforementioned method may be implemented using a module (procedure, function, etc.) which performs the aforementioned function. The module may be stored in a memory and executed by a processor. The memory may be disposed to the processor internally or externally and connected to the processor using various well-known means. The processor may include application-specific integrated circuit (ASIC), other chipsets, logic circuits, and/or data processors. The memory may include a read-only memory (ROM), a random access memory (RAM), a flash memory, a memory card, storage media and/or other storage devices. That is, the embodiments described herein may be implemented and performed on a processor, a microprocessor, a controller, or a chip. For example, the functional units shown in each drawing may be implemented and performed on a computer, a processor, a microprocessor, a controller, or a chip. In this case, information for implementation (e.g., information on instructions) or an algorithm may be stored in a digital storage medium.

Further, the decoding apparatus and the encoding apparatus to which the present disclosure is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, camcorder, a video on demand (VoD) service provider, an over the top video (OTT) device, an internet streaming service provider, a 3D video device, a virtual reality (VR) device, an augment reality (AR) device, an image telephone video device, a vehicle terminal (e.g., a vehicle (including an autonomous vehicle) terminal, an airplane terminal, a ship terminal, etc.) and a medical video device, and the like, and may be used to process a video signal or a data signal. For example, the OTT video device may include a game console, a Blu-ray player, an Internet-connected TV, a home theater system, a smartphone, a tablet PC, a digital video recorder (DVR), and the like.

Further, the processing method to which the present disclosure is applied may be produced in the form of a program being executed by a computer and may be stored in a computer-readable recording medium. Multimedia data having a data structure according to the present disclosure may also be stored in the computer-readable recording medium. The computer readable recording medium includes all kinds of storage devices and distributed storage devices in which computer readable data is stored. The computer-readable recording medium may be, for example, a Blu-ray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (e.g., transmission over the Internet). Further, a bitstream generated by the encoding method may be stored in the computer-readable recording medium or transmitted through a wired or wireless communication network.

In addition, the embodiments of the present disclosure may be embodied as a computer program product based on a program code, and the program code may be executed on a computer by the embodiments of the present disclosure. The program code may be stored on a computer-readable carrier.

Figure 15:
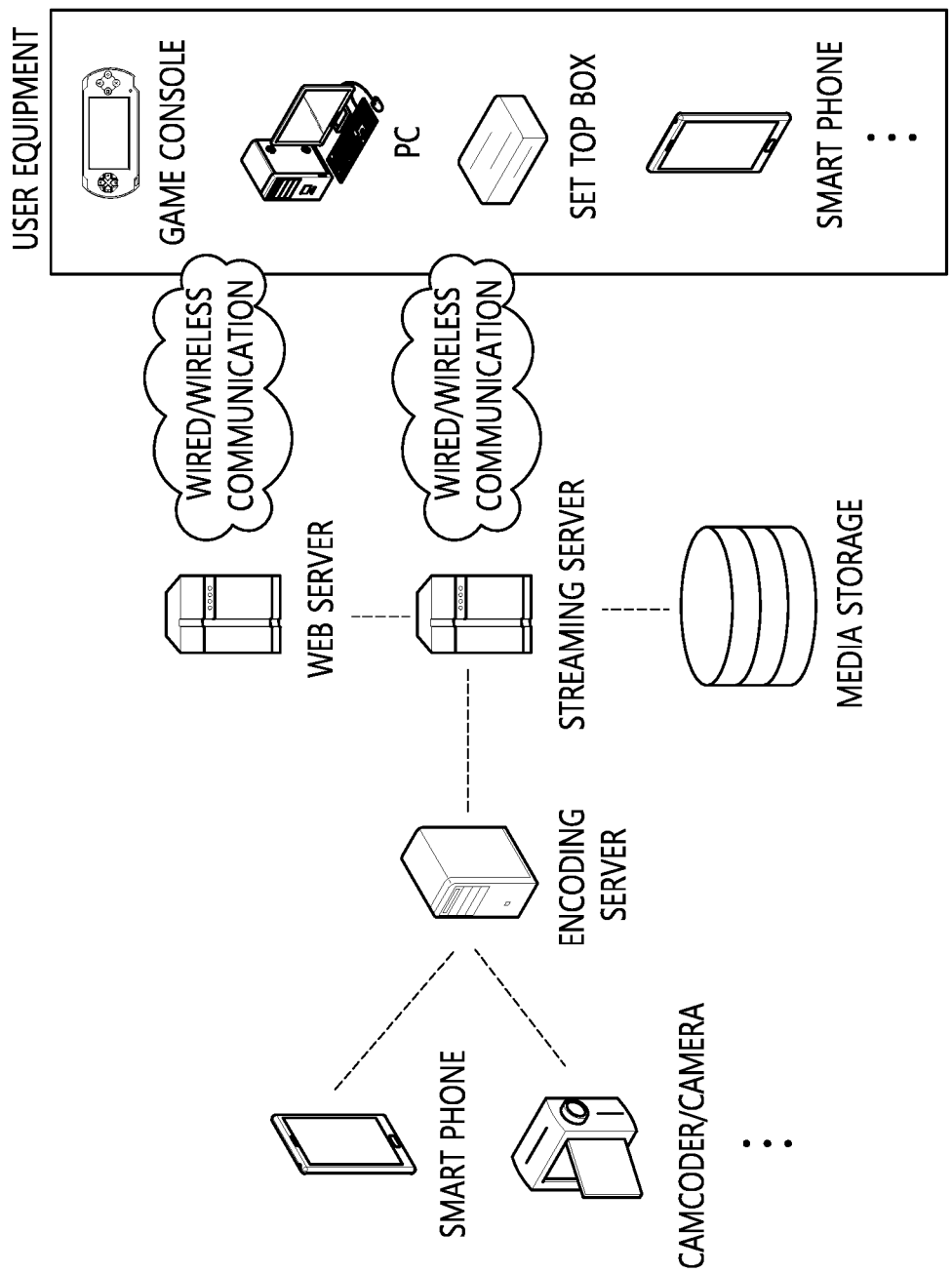
FIG. 15 represents an example of a content streaming system to which the disclosure of this document may be applied.

FIG. 15 represents an example of a content streaming system to which the disclosure of the present document may be applied.

Referring to FIG. 15, the content streaming system to which the embodiments of the present disclosure is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the embodiments of the present disclosure is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the content streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the content streaming system may be operated as a distributed server, and in this case, data received by each server may be processed in distributed manner.

What is claimed is:

1. An image decoding method performed by a decoding apparatus, comprising:
    obtaining most probable mode (MPM) flag information related to whether an intra prediction mode for a current block is derived based on MPM candidates for the current block and multi-reference line (MRL) index information for at least one reference sample line for intra prediction of the current block from a bitstream;
    deriving the intra prediction mode for the current block based on the MPM flag information and the MRL index information;
    deriving prediction samples for the current block based on the intra prediction mode for the current block; and
    generating a reconstructed picture based on the prediction samples,
    wherein based on a value of the MRL index information being equal to 0, the MPM flag information is obtained from the bitstream,
    wherein based on a value of the MPM flag information being equal to 1 and the value of the MRL index information being equal to 0, planar flag information indicating whether the intra prediction mode for the current block is a planar mode is obtained from the bitstream, and
    wherein the intra prediction mode of the current block is derived based on a value of the planar flag information.

2. The image decoding method of claim 1, wherein based on the value of the planar flag information indicating that the intra prediction mode for the current block is the planar mode, the intra prediction mode for the current block is derived as the planar mode.

3. The image decoding method of claim 1, wherein based on the value of the planar flag information indicating that the intra prediction mode for the current block is not the planar mode, MPM index information related to one of the MPM candidates from which the planar mode has been excluded is obtained from the bitstream, and
    wherein the intra prediction mode for the current block is derived based on a value of the MPM index information.

4. The image decoding method of claim 3, wherein a number of the MPM candidates for the current block from which the planar mode has been excluded is five.

5. The image decoding method of claim 1, wherein based on the value of the MRL index information being not equal to 0, MPM index information related to one of the MPM candidates from which the planar mode has been excluded is obtained from the bitstream without obtaining the planar flag information from the bitstream, and
    wherein the intra prediction mode for the current block is derived based on the MPM candidates from which the planar mode has been excluded and a value of the MPM index information.

6. The image decoding method of claim 1, further comprising:
obtaining intra subpartitions mode flag information for the current block from the bitstream,
wherein the value of the planar flag information is derived based on a context model for a bin associated with the planar flag information,
wherein the context model for the bin associated with the planar flag information is derived based on a context index increment (ctxInc), and
wherein a value of the context index increment is determined based on a value of the intra subpartitions mode flag information.

7. The image decoding method of claim 6, wherein based on the value of the intra subpartitions mode flag information being equal to 0, the value of the context index increment is determined to be 1, and
wherein based on the value of the intra subpartitions mode flag information being equal to 1, the value of the context index increment is determined to be 0.

8. An image encoding method performed by an encoding apparatus, comprising:
deriving an intra prediction mode for a current block;
generating multi-reference line (MRL) index information related to at least one reference sample line for intra prediction of the current block;
generating most probable mode (MPM) flag information related to whether the intra prediction mode for the current block is derived based on MPM candidates for the current block; and
encoding image information including at least one of the MPM flag information or the MRL index information,
wherein based on a value of the MRL index information being equal to 0, the MPM flag information is encoded into a bitstream, and
wherein based on a value of the MPM flag information being equal to 1 and the value of the MRL index information being equal to 0, planar flag information indicating whether the intra prediction mode for the current block is a planar mode is encoded into the bitstream.

9. The image encoding method of claim 8, wherein based on the value of the planar flag information indicating that the intra prediction mode for the current block is not the planar mode, MPM index information related to one of the MPM candidates for the current block from which the planar mode has been excluded is encoded into the bitstream.

10. The image encoding method of claim 9, wherein a number of the MPM candidates for the current block from which the planar mode has been excluded is five.

11. The image encoding method of claim 8, wherein based on the value of the MRL index information being not equal to 0, the intra prediction mode for the current block is derived based on one of the MPM candidates from which the planar mode has been excluded, and
wherein MPM index information related to the one of the MPM candidates for the current block from which the planar mode has been excluded is encoded without encoding the planar flag information.

12. The image encoding method of claim 8, further comprising:
generating intra subpartitions mode flag information for the current block,
wherein the value of the planar flag information is represented based on a context model for a bin associated with the planar flag information,
wherein the context model for the bin associated with the planar flag information is derived based on a context index increment (ctxInc), and
wherein a value of the context index increment is determined based on a value of the intra subpartitions mode flag information.

13. The image encoding method of claim 12, wherein based on the value of the intra subpartitions mode flag information being equal to 0, the value of the context index increment is determined to be 1, and
wherein based on the value of the intra subpartitions mode flag information being equal to 1, the value of the context index increment is determined to be 0.

14. A transmission method of data for image information, comprising:
obtaining a bitstream for the image information, wherein the bitstream is generated by deriving an intra prediction mode for a current block, generating multi-reference line (MRL) index information related to at least one reference sample line for intra prediction of the current block, generating most probable mode (MPM) flag information related to whether the intra prediction mode for the current block is derived based on MPM candidates for the current block, and encoding the image information including at least one of the MPM flag information or the MRL index information; and
transmitting the data including the bitstream,
wherein based on a value of the MRL index information being equal to 0, the MPM flag information is encoded into the bitstream, and
wherein based on a value of the MPM flag information being equal to 1 and the value of the MRL index information being equal to 0, planar flag information indicating whether the intra prediction mode for the current block is a planar mode is encoded into the bitstream.

* * * * *